US007539663B2

(12) United States Patent
Bernstein et al.

(10) Patent No.: US 7,539,663 B2
(45) Date of Patent: May 26, 2009

(54) MAPPING COMPOSITION USING ALGEBRAIC OPERATORS

(75) Inventors: Philip A. Bernstein, Bellevue, WA (US); Todd J. Green, Philadelphia, PA (US); Sergey Melnik, Kirkland, WA (US); Alan Nash, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 262 days.

(21) Appl. No.: 11/599,744

(22) Filed: Nov. 15, 2006

(65) Prior Publication Data

US 2008/0114785 A1 May 15, 2008

(51) Int. Cl.
G06F 7/00 (2006.01)
G06F 17/30 (2006.01)
(52) U.S. Cl. .............................. 707/2; 707/3
(58) Field of Classification Search ................ 707/1–3, 707/6, 100, 104.1, 127, 136
See application file for complete search history.

(56) References Cited

U.S. PATENT DOCUMENTS

| 4,769,772 | A * | 9/1988 | Dwyer ..................... 707/2 |
| 5,717,924 | A | 2/1998 | Kawai |
| 5,778,373 | A | 7/1998 | Levy et al. |
| 5,806,066 | A | 9/1998 | Golshani et al. |
| 6,704,744 | B1 | 3/2004 | Williamson et al. |
| 6,718,320 | B1 | 4/2004 | Subramanian et al. |
| 6,785,689 | B1 | 8/2004 | Daniel et al. |
| 6,915,305 | B2 | 7/2005 | Subramanian et al. |
| 7,089,266 | B2 | 8/2006 | Stolte et al. |
| 2005/0132336 | A1* | 6/2005 | Gotwals et al. ............ 717/127 |
| 2005/0257193 | A1 | 11/2005 | Falk et al. |
| 2007/0038651 | A1* | 2/2007 | Bernstein et al. ............ 707/100 |
| 2007/0276787 | A1* | 11/2007 | Piedmonte ..................... 707/2 |
| 2007/0276802 | A1* | 11/2007 | Piedmonte ..................... 707/3 |

OTHER PUBLICATIONS

Sergey Melnik (2005), Supporting executable mappings in model management, pp. 167-178.*
Bernstein et al., "Implementing Mapping Composition", Date: Sep. 2006, http://research.microsoft.com/~melnik/pub/VLDB06_composition.pdf.
Fagin et al., "Composing Schema Mappings: Second-Order Dependencies to the Rescue", Date: 2004, pp. 1-60.n, No. 20, http://www.almaden.ibm.com/cs/people/fagin/compose.pdf.
Madhavan et al., "Representing and Reasoning about Mappings between Domain Models", Date: 2002, http://citeseer.ist.psu.edu/cache/papers/cs/26171/http:zSzzSzwww.cs.washington.eduzSzhomeszSziavantzSzPubszSzSemanticsAAA102.pdf/.

* cited by examiner

*Primary Examiner*—Don Wong
*Assistant Examiner*—Merilyn P Nguyen

(57) ABSTRACT

A general-purpose reusable algebraic-based composition algorithm for composing mappings between data schemas. The algorithm handles more expressive mappings, makes a best-effort to eliminate symbols when a perfect answer cannot be obtained, includes new heuristics, and is extensible. A relational algebraic language is provided wherein each mapping is expressed as a set of constraints, and each constraint is either a containment or equality of two or more relational algebraic expressions. The composition mechanism exploits monotonicity properties of algebraic operators in operator arguments, handles NULLs and bag semantics, operates to allow composition to produce a partial result when a complete result is not possible, facilitates symbols elimination one symbol at a time using left composition, for example, as a way of isolating the symbols, supports making a best-effort to eliminate as many symbols as possible from an intermediate schema, and handles unknown or partially known operators via delayed handling.

8 Claims, 13 Drawing Sheets

MAPPING COMPOSITION USING ALGEBRAIC OPERATORS

BACKGROUND

Vast amounts of information are being stored in data sources in accordance with different storage models (e.g., relational, object) thereby causing a continuing problem in data translation between the data sources. This presents a major problem to companies and individuals in that the data existing in one model (or schema) needs to be accessed via a different model (or schema). Such an example can be found in data warehousing where data is received from many different sources for storage and quick access from other sources. Converting data from one model (or schema) to another model is not only time-consuming and resource intensive, but can be fraught with conversion problems.

Data mapping is a technique utilized for creating a data transformation between disparate data sources (or schemas). More specifically, a data mapping is a relationship between the instances of two different schemas. In one example, consider three data schemas—schema one, schema two, and schema three—where a first data mapping is derived that maps data between schema one and schema two, and a second data mapping that maps data between schema two and schema three. The goal is to compose the first and second data mappings into a third mapping that captures the same relationship between schema one and schema three as the corresponding mappings—mapping one and mapping two.

It can be appreciated that mapping composition is at the core of many important data management problems and occurs in many practical settings, including data integration, database design, peer-to-peer data management, schema evolution where a first schema evolves to become an updated schema, and the merging of two different schemas into a single schema, for example. Some common types of mappings include relational queries, relational view definitions, global-and-local-as-view (GLAV) assertions, XQuery queries, and XSL (extensible stylesheet language) transformations. Hence, general-purpose algorithms for manipulating mappings have broad application to data management. Conventional technologies lack a general-purpose reusable composition architecture for use in many application settings making data management between data models a continuing problem.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed herein is a general-purpose composition algorithm that can be used in many application settings. A composition component implements the new algebraic algorithm for composing mappings between data schemas (e.g., relational). Compared to conventional approaches, the algebraic algorithm facilitates at least the following: the handling of more expressive mappings, best-effort processing when a perfect answer cannot be obtained, new heuristics, and extensibility. The composition algorithm is algebra-based rather than logic-based, and hence, directly usable by existing database tools.

In one specific implementation, a relational algebraic language is provided wherein each mapping is expressed as a set of constraints, and each constraint is either a containment or equality of two or more relational algebraic expressions. The relational algebra is the language implemented in most, if not all, relational database systems and tools. Moreover, the existing relational operators are sufficient to express embedded dependencies, and by allowing additional operators such as set difference, the algorithm goes beyond embedded dependencies. Additionally, the disclosed language is extensible in that it extends the algebraic dependencies of conventional technologies by allowing new operators.

In accordance with more specific aspects of the subject innovation, the composition mechanism exploits monotonic properties of algebraic operators (e.g., set difference and outerjoin) in one or more of the operator arguments. The algorithm can also handle NULLs and bag semantics.

The composition component operates to allow composition to produce a partial result when a complete result is not possible; that is, eliminating some but not all of the symbols in an intermediate schema. Symbols of an intermediate schema can be eliminated one at a time using left normalization, for example, as a way of isolating the symbols. This supports the algorithm making a best-effort to eliminate as many symbols as possible from the intermediate schema. The algorithm also considers different orderings of symbols to be eliminated, such as user-defined orderings, for example.

Unknown or partially known operators are tolerated by delayed handling of such operators as long as possible, rather than rejecting the expression entirely, as in conventional technologies. Additionally, the composition component facilitates a modular system that can be extended to support new operators by adding monotonicity information, new rewriting rules, etc. Rules can be provided for normalization and denormalization, for example. Thus, rules can be written and added, as well as new operators without any specialized knowledge about the overall design. View unfolding is also exploited to eliminate a symbol in the early stages of the composition processing.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
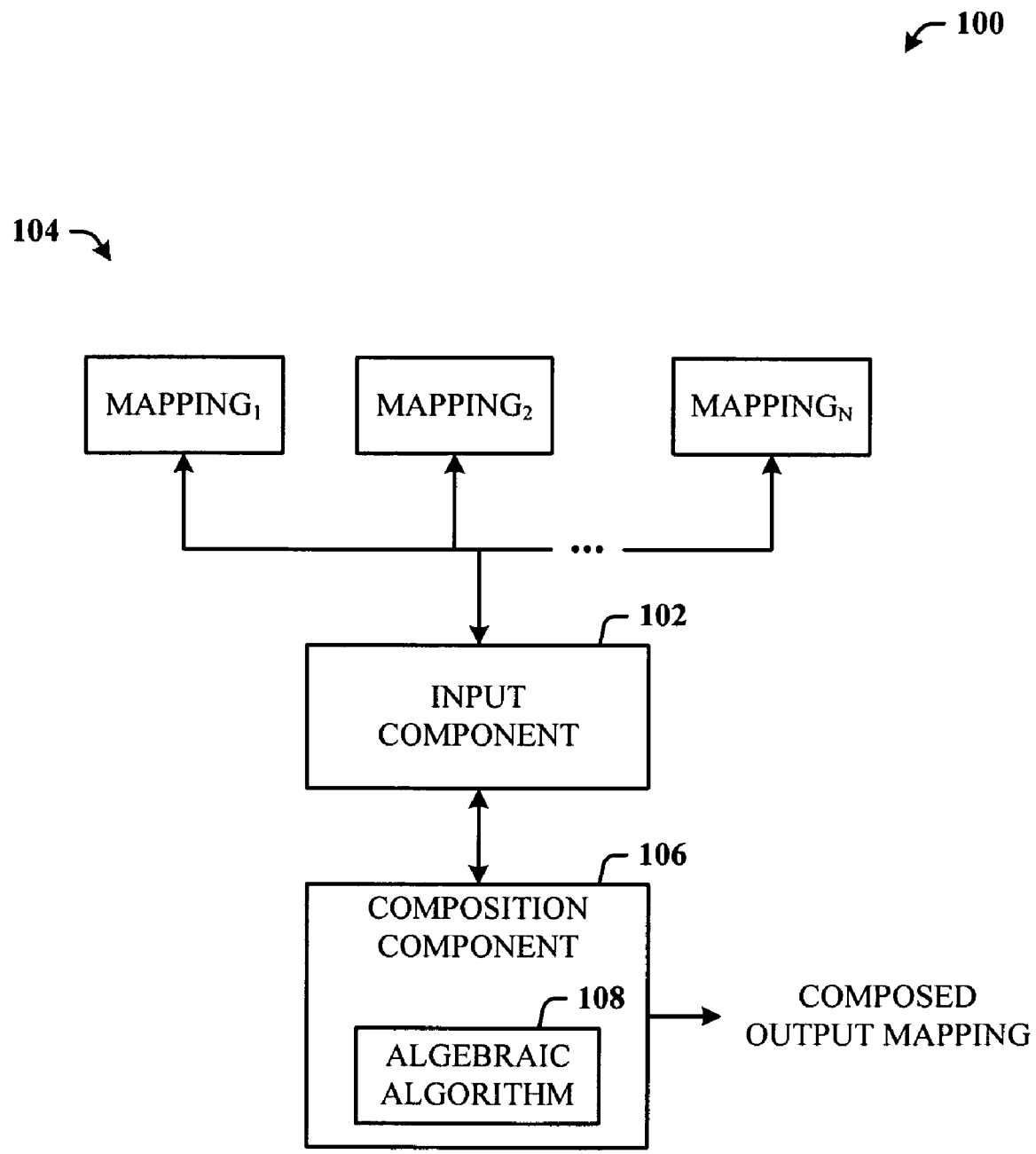
FIG. 1 illustrates a system that facilitates data management in accordance with the disclosed mapping composition algorithm.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The problem of data sharing between multiple different data sources (e.g., databases, computers, websites, and programs) is a continually evolving problem with the introduction of new data formats and storage models. Disclosed is a general-purpose data composition algorithm that can be employed in many practical application settings (e.g., relational schemas for relational databases). The mapping composition algorithm is an algebraic algorithm that receives and composes algebraic-based mappings. In a more specific application, to relational data, the algebraic algorithm can be applied to relational databases, since relational algebra is the language implemented in all relational database systems and many tools.

In a first practical peer-to-peer data management example, composition is used to support queries and updates on peer databases. When two peer databases are connected through a sequence of mappings (also referred to herein as mapping data) between intermediate peers, these mappings can be composed to relate the peer databases directly.

A second example is schema evolution, where a schema $\sigma_1$ evolves to become a schema $\sigma_1'$. The relationship between schemas $\sigma_1$ and $\sigma_1'$ can be described by a mapping. After $\sigma_1$ as evolved, any existing mappings involving $\sigma_1$, such as a mapping from $\sigma_1$ to schema $\sigma_2$, should now be upgraded to a mapping from $\sigma_1'$ to $\sigma_2$. This can be accomplished by composing the $\sigma_1'$-$\sigma_1$ mapping with the $\sigma_1$-$\sigma_2$ mapping. Depending on the application, one or both of these mappings may be non-functional, in which case composing mappings is no longer simply function composition.

A different schema evolution problem arises when an initial schema $\sigma_1$ is modified by two independent designers, producing schemas $\sigma_2$ and $\sigma_3$. To merge the schemas into a single schema, it is desired to obtain a mapping between $\sigma_2$ and $\sigma_3$ that describes the overlapping content. The $\sigma_2$-$\sigma_3$ mapping can be obtained by composing the $\sigma_1$-$\sigma_2$ and $\sigma_1$-$\sigma_3$ mappings. Even if the latter two mappings are functions, one of the functions should be inverted before composition. Since the inverse of a function may not be a function, this entails the composition of non-functional mappings.

Next, consider a database design process that evolves a schema $\sigma_1$ via a sequence of incremental modifications. This produces a sequence of mappings between successive versions of the schema, from $\sigma_1$ to $\sigma_2$, then to $\sigma_3$, and so forth, until the desired schema $\sigma_n$ is reached, where n is a positive integer. At the end of this process, a mapping from $\sigma_1$ to the evolved schema $\sigma_n$ is needed, for example, as input to the schema evolution scenarios above. This mapping can be obtained by composing the mappings between the successive versions of the schema. The following example illustrates this last scenario.

Consider a schema editor, in which the designer modifies a database schema, resulting in a sequence of schemas with mappings therebetween. The initial schema is, Movies(mid, name, year, rating, genre, theater)

where mid is a movie identifier. The designer decides that only 5-star movies and no 'theater' or 'genre' should be present in the database; the designer edits the table and obtains the following schema and mapping:

FiveStarMovies(mid, name, year)

$$\pi_{mid,name,year}(\sigma_{rating=5}(Movies)) \subseteq FiveStarMovies \quad (1)$$

To improve the organization of the data, the designer then splits the FiveStarMovies table into two tables, resulting in a new schema and mapping, Names(mid, name) Years(mid, year)

$$\pi_{mid,name,year}(FiveStarMovies) \subseteq Names \bowtie Years \quad (2)$$

The system composes mappings (1) and (2) into a new mapping:

$$\pi_{mid,name}(\sigma_{rating=5}(Movies)) \subseteq Names$$

$$\pi_{mid,year}(\sigma_{rating=5}(Movies)) \subseteq Years$$

With this mapping, the designer can now migrate data from the old schema to the new schema, reformulate queries posed over one schema to equivalent queries over the other schema, and perform other data processing.

Finally, in a data integration example, a query needs to be composed with a view definition. If the view definition is expressed using global-as-view (GAV), then this is an example of composing two functional mappings: a view definition that maps a database to a view, and a query that maps a view to a query result. The standard approach is view unfolding, where references to the view in the query are replaced by the view definition. View unfolding is function composition, where a function definition (e.g., the body of the view) is substituted for references to the function (e.g., the view schema) in the query.

As exhibited by the above examples, the algebraic composition algorithm described herein finds widespread application to data transformation and composition problems. Additionally, the algorithm includes other characteristics such as view unfolding, best-effort symbol elimination, left composition, normalization, leveraging of operator monotonicity, extensibility and modularity, which will be described with greater specificity infra.

Referring initially to the drawings, FIG. 1 illustrates a system 100 that facilitates data management in accordance with the disclosed mapping composition algorithm. The system 100 includes an input component 102 that receives as input mapping data 104 (denoted as MAPPING$_1$, MAP- PING$_2$, ..., MAPPING$_N$, where N is a positive integer) created for data transformation between dataset schemas (not shown). The mapping data 104 expresses schema constraints between the dataset schemas using algebraic operators. The system 100 also includes a composition component 106 for composing the mapping data 104 into composed output mapping data using an algebraic algorithm (or language) 108, the output mapping data preserving the constraints between the schemas, as provided by the input schemas and carried into the mappings 104.

Given the inherent difficulty of the problem and limitations of conventional approaches, the disclosed mapping composition algorithm can be of greater practical value when algebra-based, rather than the conventional logic-based methods, are used. Aspects of the algebraic algorithm will now be described in the context of a relational application. However, it is to be understood that this should not be construed as limiting in any way, as the disclosed innovation applies to non-relational applications as well.

In the relational context, the composition algorithm is algebraic for handling relational algebraic operators more commonly associated with relational databases. Accordingly, the composition algorithm can be used directly by existing database tools. As a relational algebraic language algorithm, each mapping is expressed as a set of constraints, the constraints expressed either as a containment or equality of two relational algebraic expressions. This extends the algebraic dependencies of conventional methods. Each constraint is of the form $E_1=E_2$ or $E_1 \subseteq E_2$, where $E_1$ and $E_2$ are arbitrary relational expressions containing not only select, project, and join but potentially many other operators.

Relational algebra is the language implemented in essentially all relational database systems and most tools. It is therefore familiar to the developers of such systems. Moreover, the disclosed algorithm is extensible by allowing the addition of new relational operators. Note that the relational operators described herein are sufficient to express embedded dependencies. Therefore, the class of mappings which the algorithm accepts includes embedded dependencies and, by allowing additional operators such as set difference, extends beyond that class of mappings.

Figure 2:
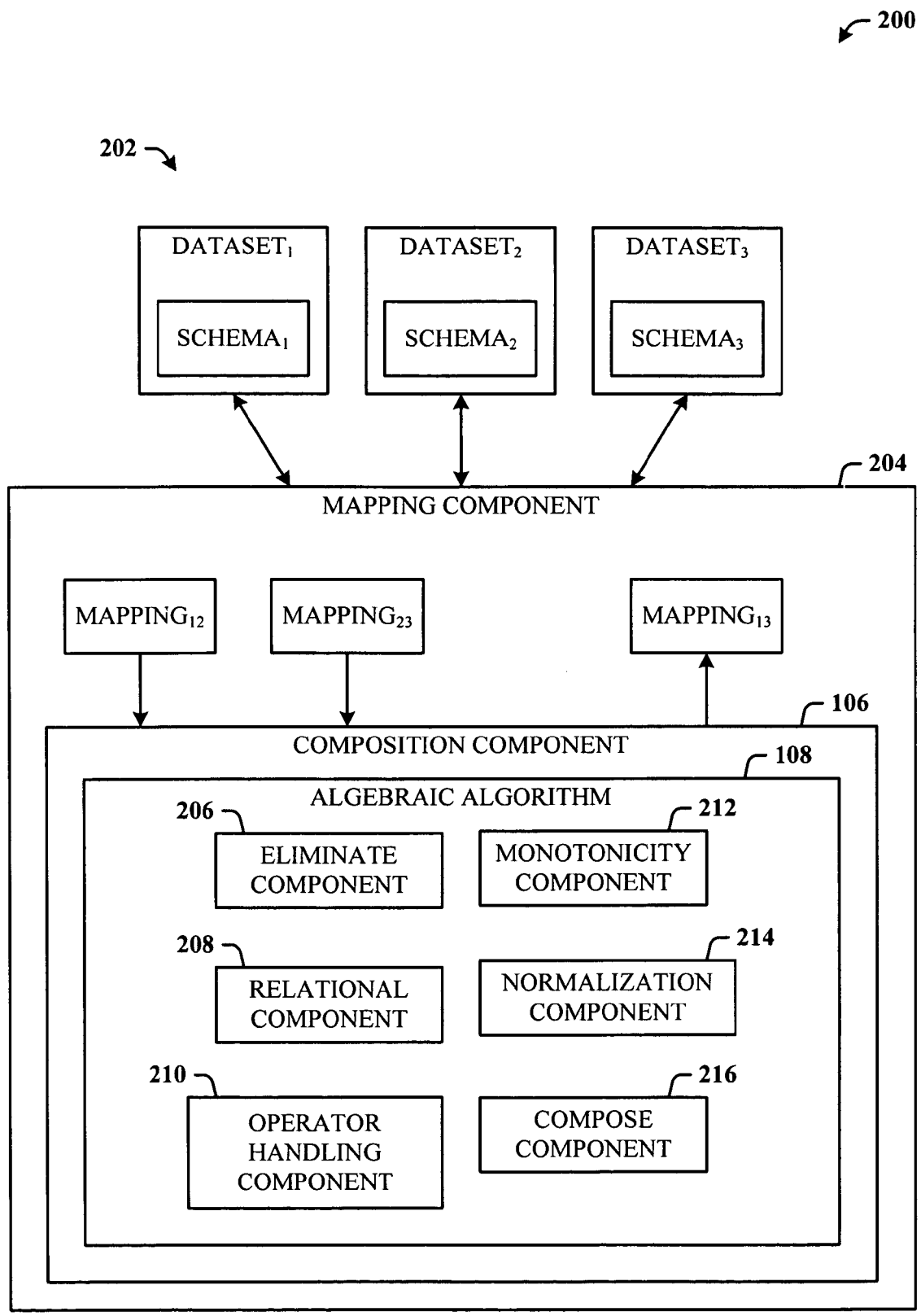
FIG. 2 illustrates a more detailed alternative system that obtains benefit of the algebraic composition algorithm.

FIG. 2 illustrates a more detailed alternative system 200 that obtains benefit of the algebraic composition algorithm. The system 200 shows a plurality of datasets 202 (denoted DATASET$_1$, DATASET$_2$, and DATASET$_3$) having respective schemas (denoted SCHEMA$_1$, SCHEMA$_2$, and SCHEMA$_3$) that define the structure of the corresponding datasets 202.

The system 200 also includes a mapping component 204 that interfaces to dataset systems (not shown) and which can include or interface to the datasets 202. For example, the dataset system can be a database server having an external datastore, a web server having an internal datastore, a PC having data on a mass storage device or cache subsystem, a portable system (e.g., portable computer, mobile phone) in which data resides, or program data to be exchanged between programs of different structures. Accordingly, the mapping component 204 can request and obtain the schema information from the dataset systems for mapping and mapping composition processes.

In this particular implementation, the mapping component 204 includes the function of the input component 102 of FIG. 1. Additionally, the composition component 106 can be included as part of the mapping component 204 to facilitate schema mapping and mapping composition. However, this is not a requirement, in that the components (106 and 204) can be separate but with a suitable interface to provide the same desired results.

Here, the mapping component 204 creates the mappings (MAPPING$_{12}$ and MAPPING$_{23}$) for the respective dataset schemas (SCHEMA$_1$/SCHEMA$_2$ and SCHEMA$_2$/SCHEMA$_3$). The input mappings (MAPPING$_{12}$ and MAPPING$_{23}$) are input to a composition component 106 for algebraic composition thereof, and the mapping component 204 outputs a composed output mapping (MAPPING$_{13}$). In support thereof, and for the processing of algebraic operators, the composition component 106 can include the algebraic algorithm 108 of FIG. 1.

The algebraic component 108 can include other components that facilitate algebraic composition mapping. In this implementation, the component 108 further includes an eliminate component 206 for eliminating intermediate schema $\sigma_2$ (also referred to as signature) symbols one at a time when desired. This supports providing a partial solution to the composition of algebraic mappings when unable to find a complete solution. The algorithm 108 makes a best effort to eliminate as many relation symbols from the intermediate schema $\sigma_2$ as possible, even if it cannot eliminate all of the symbols. By contrast to conventional algorithms, if unable to produce a mapping over schemas $\sigma_1$ and $\sigma_3$ with no $\sigma_2$-symbols, the algorithm simply runs forever or fails.

As recognized herein, in some cases it may be better to eliminate some symbols from the intermediate schema $\sigma_2$ successfully, rather than insist on either eliminating all of the symbols or failing altogether. Thus, the resulting composed output mapping (MAPPING$_{13}$) may be over schema $\sigma_1$, new schema $\sigma'_2$, and schema $\sigma_3$, where new schema $\sigma'_2$ is a subset of schema $\sigma_2$ rather than over schemas $\sigma_1$ and $\sigma_3$.

To see the benefit of this best-effort approach, consider a composition that produces a mapping m that contains an intermediate $\sigma_2$-symbol S. If m is later composed with another mapping, it is possible that the latter composition can eliminate S. Additionally, the inability to eliminate S may be inherent in the given mappings. For example, S may be involved in a recursive computation that cannot be expressed purely in terms of $\sigma_1$ and $\sigma_3$:

$$R \subseteq S, S=tc(S), S \subseteq T$$

where $\sigma_1=\{R\}$, $\sigma_2=\{S\}$, $\sigma_3=\{T\}$, with R, S, T binary and where the middle constraint indicates that S is transitively closed. In this case, symbol S cannot be eliminated, but is definable as a recursive view on R and can be added to schema $\sigma_1$. To use the mapping, the non-eliminated $\sigma_2$-symbols may need to be populated as intermediate relations that will be discarded at the end. In this example, this involves low computational cost. In many applications, it is better to have such an approximation to a desired composition mapping than no mapping at all. Moreover, in many cases, the extra cost associated with maintaining the extra schema $\sigma_2$ symbols is low.

One way to eliminate a relation symbol S is to replace occurrences of S in some constraints by the expression on the other side of a constraint that is normalized for S. There are two versions of this replacement process: right compose and left compose. In right compose, a constraint $E \subseteq S$ is used that is right-normalized for S and E is substituted for S on the left side of a constraint that is monotonic in S, such as transforming $R \times S \subseteq T$ into $R \times E \subseteq T$, thereby eliminating S from the constraint. Right composition as applied here is an extension to conventional algorithms. Left compose handles some additional cases where right compose fails. Consider example constraints $E_2 \subseteq M(S)$ and $S \subseteq E_1$, where $M(S)$ is an expression that is monotonic in S but which it is unknown how to right-normalize or which would fail to right-denormalize. Then, left compose immediately yields $E_2 \subseteq M(E_1)$.

A relational component 208 facilitates the processing of relational data as applied to relational systems. For example, the algorithm 108 is extensible by allowing additional information to be added separately for each operator (e.g., relational) in the form of information about monotonicity and rules for normalization and denormalization. Many of the steps can be rule-based and implemented in such a way that it is easy to add rules and/or new operators. Therefore, the algorithm can be easily configured to handle additional operators without specialized knowledge about its overall design. All that is needed is to add new rules. This also makes the algorithm modular for implementation in different systems and with other software/hardware components.

The algorithm 108 can further include an operator handling component 210 for processing known or partially unknown operators. Instead of rejecting an algebraic expression because it contains unknown operators which the algorithm 108 does not know how to handle, the algorithm 108 delays handling of such operators as long as possible. Sometimes, the algorithm 108 requires no knowledge at all of the operators involved. This is the case, for example, when a subexpression that contains an unknown operator can be replaced by another expression. At other times, only partial knowledge is needed about an operator. Even if the partial knowledge is unavailable, the algorithm does not fail globally, but simply does not eliminate one or more symbols that perhaps could have eliminated had the additional knowledge about the behavior of the operator been known.

The algorithm 108 can include a monotonicity component 212 for exploiting monotonicity of operators. One type of partial knowledge that can be exploited by the handling component 210 is monotonicity of operators. An operator is monotone in one of its relation symbol arguments if, when tuples are added to that relation, no tuples disappear from its output. For example, select, project, join, union, and semijoin are all monotone. Set difference (e.g., R−S) and left outerjoin are monotone in the first argument (R) but not in the second (S). When an operator is monotone in an argument, that argument can sometimes be replaced by an expression from another constraint. For example, if $E_1 \subseteq R$ and $E_2 \subseteq S$, then in some cases it is valid to replace R by $E_1$ in R−S, but not to replace S by $E_2$.

Although conventional algorithms only work with select, project, join, and union, this observation enables the algorithm 108 to handle outerjoin, set difference, and anti-semijoin. Moreover, the algorithm 108 can handle nulls and bag semantics in many cases. Bag semantics are sets in which some of the elements are duplicates. When operators are computed two sets are being processed, and any elements that appear in both sets would appear in the output as multiples. Instead of the usual set semantics, the disclosed algorithm eliminates duplicates. Note that operators can behave differently under bag semantics.

The algorithm 108 can further include a normalization component 214 that facilitates both normalization and denormalization. As referred to herein, left-normalization is the process of bringing the constraints to a form where a relation symbol S that is trying to be eliminated appears in a single constraint alone on the left. The result is of the form $S \subseteq E$, where E is an expression. Right-normalization is defined similarly, that is, the process of bringing the constraints to a form where a relation symbol S the algorithm 108 is trying to eliminate appears in a single constraint alone on the right. Normalization may introduce "pseudo-operators" such as Skolem functions which then need to be eliminated by a denormalization step. For example, right normalization under the algorithm 108 can handle projections by Skolemization.

Simplistically, Skolemization is a way of removing a logical symbol from a formula. The corresponding denormalization can be very complex. However, it is noted that normalization and denormalization are general steps which can be extended on an operator-by-operator basis.

The algorithm 108 can further include a compose component 216 that processes information from one or more of the other components (206, 208, 210, 212 and 214) as part of the composition process. Each of the components 206, 208, 210, 212, 214 and 216 will be described in detail below.

Figure 3:
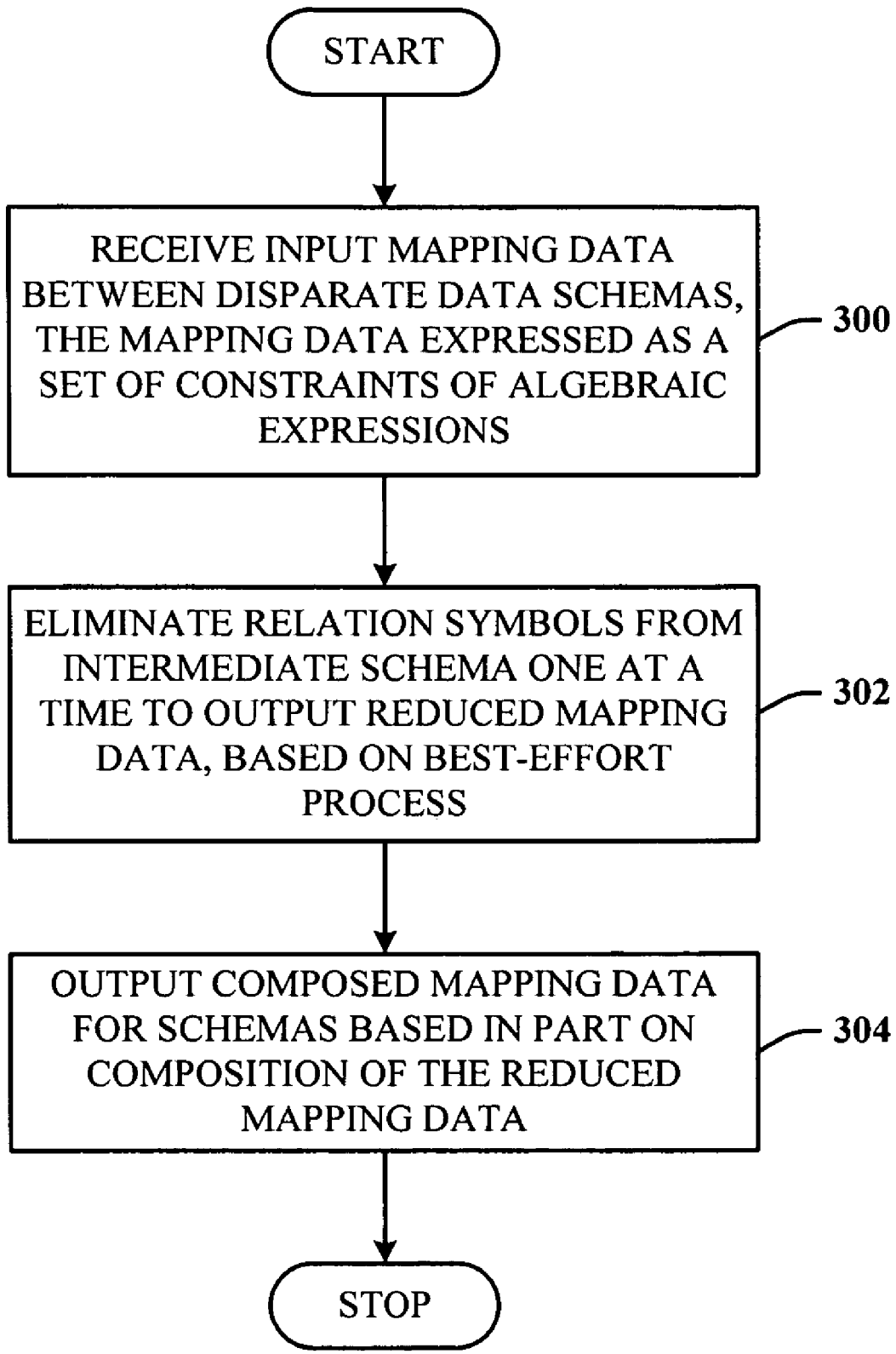
FIG. 3 illustrates a method of managing data using the algebraic composition algorithm on relational operators.

FIG. 3 illustrates a method of managing data using the algebraic composition algorithm on relational operators. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 300, input mappings (mapping data) between disparate data schemas are received. The mapping data is expressed as a set of constraints of algebraic expressions (e.g., relational). At 302, the algorithm attempts to eliminate relation symbols (e.g., one at a time) from an intermediate schema to output reduced mapping data. Symbol elimination is attempted based on a best-effort process. At 304, a composed mapping data for the schemas is output based in part on composition of the reduced mapping data.

Following is preliminary information that will assist in further detailed description of the algebraic algorithm and operations. Adopted herein is the unnamed perspective which references the attributes of a relation by index rather than by name. A relational expression is an expression formed using base relations and the basic operators union $\cup$, intersection $\cap$, cross product ×, set difference −, projection $\pi$, and selection $\sigma$ as follows. The name S of a relation is a relational expression. If $E_1$ and $E_2$ are relational expressions, then so are

| | | |
|---|---|---|
| $E_1 \cup E_2$, | $E_1 \cap E_2$, | $E_1 \times E_2$, |
| $E_1 - E_2$, | $\sigma_c(E_1)$, | $\pi_I(E_1)$, | where c is an arbitrary Boolean formula on attributes (identified by index) and constants and I is a list of indexes. The meaning of a relational expression is given by the standard set semantics. To simplify the presentation in this paper, six basic relational operators are considered and the join operator $\bowtie$ is viewed as a derived operator formed from ×, $\pi$, and $\sigma$. Additionally, user-defined operators are allowed to appear in expressions. In one implementation, the basic operators are considered as those which have "built-in" support; however, these are not the only operators supported.

The basic operators differ in behavior with respect to arity (the number of domains of a relation). Assume expression $E_1$ has arity r and expression $E_2$ has arity s. Then the arity of $E_1 \cup E_2$, $E_1 \cap E_2$, and $E_1 - E_2$ is r=s; the arity of $E_1 \times E_2$ is r+s; the arity of $\sigma_c(E_1)$ is r; and the arity of $\sigma_I(E_1)$ is |I|.

Defined herein is a Skolem function that is an additional operator which may be used in relational expressions. A Skolem function has a name and a set of indexes. Let $f$ be a Skolem function on indexes I. Then $f_I(E_1)$ is an expression of arity r+1. Intuitively, the meaning of the operator is to add an attribute to the output, whose values are some function f of the attribute values identified by the indexes in I. Skolem functions are used internally as technical devices for right compose, and which are further described below.

Consider constraints of two forms. A containment constraint is a constraint of the form $E_1 \subseteq E_2$, where $E_1$ and $E_2$ are relational expressions. An equality constraint is a constraint of the form $E_1 = E_2$, where $E_1$ and $E_2$ are relational expressions. Sets of constraints are denoted with capital Greek letters, and individual constraints with lowercase Greek letters.

A signature is a function from a set of relation symbols to positive integers which give the arities. The terms "signature" and "schema" are used synonymously herein. Signatures are denoted with the character σ (sigma) and use the same symbol σ to mean simply the domain of the signature (a set of relations). Relation symbols are denoted with uppercase Roman letters R, S, T, etc.

An instance of a database schema is a database that conforms to that schema. Uppercase Roman letters A, B, C, etc., are used to denote instances. If A is an instance of a database schema containing the relation symbol S, the contents of the relation S in A is denoted by $S^A$.

Given a relational expression E and a relational symbol S, E is said to be monotone in S if whenever instances A and B agree on all relations except S and $S^A \subseteq S^B$, then $E(A) \subseteq E(B)$. In other words, E is monotone in S if adding more tuples to S only adds more tuples to the query result. It is said that E is anti-monotone in S if whenever A and B agree on all relations except S and $S^A \subseteq S^B$, then $E(A) \supseteq E(B)$.

The active domain of an instance is the set of values that appear in the instance. A special relational symbol D is used to denote the active domain of an instance. D can be thought of as a shorthand for the relational expression $\cup_{i=1}^{n} \cup_{j=1}^{a_i} \pi_j(S_i)$, where $\sigma = \{S_1, \ldots, S_n\}$ is the signature of the database and $a_i$ is the arity of relation $S_i$. Another special relation used in expressions is the empty relation Ø.

An instance A satisfies a containment constraint $E_1 \subseteq E_2$ if $E_1(A) \subseteq E_2(A)$. An instance A satisfies an equality constraint $E_1 = E_2$ if $E_1(A) = E_2(A)$. It is written as $A \models \xi$ if the instance A satisfies the constraint ξ and $A \models \Sigma$ if A satisfies every constraint in Σ. Note that $A \models E_1 = E_2$ iff $A \models E_1 \subseteq E_2$ and $A \models E_2 \subseteq E_1$. As an example, the constraint that the first attribute of a binary relation S is the key for the relation, which can be expressed in a logic-based setting as the equality-generating dependency $S(x, y), S(x, z) \to y=z$, may be expressed in this setting as a containment constraint by making use of the active domain relation $$\pi_{24}(\sigma_{1=3}(S^2)) \subseteq \sigma_{1=2}(D^2),$$

where $S^2$ is short for S×S and $D^2$ is short for D×D.

A mapping is a binary relation on instances of database schemas. The letter m is reserved for mappings. Given a class of constraints $\mathcal{L}$, with every expression of the form $(\sigma_1, \sigma_2, \Sigma_{12})$ is associated the mapping $$\{\langle A,B\rangle : (A,B) \models \Sigma_{12}\}.$$

That is, the mapping defines which instances of two schemas correspond to each other. Here $\Sigma_{12}$ is a finite subset of $\mathcal{L}$ over the signature $\sigma_1 \cup \sigma_2$, $\sigma_1$ is the input (or source) signature, $\sigma_2$ is the output (or target) signature, A is a database with signature $\sigma_1$ and B is a database with signature $\sigma_2$. It is assumed that $\sigma_1$ and $\sigma_2$ are disjoint. (A,B) is the database with signature $\sigma_1 \cup \sigma_2$ obtained by taking all the relations in A and B together. The active domain is the union of the active domains of A and B. In this case, it is said that m is given by $(\sigma_1, \sigma_2, \Sigma_{12})$.

Given two mappings $m_{12}$ and $m_{23}$, the composition $m_{12} \circ m_{23}$ is the unique mapping $$\{\langle A,C\rangle : \exists B(\langle A,B\rangle \in m_{12} \text{ and } \langle B,C\rangle \in m_{23})\}.$$

Assume two mappings $m_{12}$ and $m_{23}$ are given by $(\sigma_1, \sigma_2, \Sigma_{12})$ and $(\sigma_2, \sigma_3, \Sigma_{23})$. The mapping composition problem is to find $\sigma_{13}$ such that $m_{12} \circ m_{23}$ is given by $(\sigma_1, \sigma_3, \Sigma_{13})$. Given a finite set of constraints Σ over some schema σ and another finite set of constraints σ' over some subschema σ' of σ, it is said that Σ is equivalent to Σ', denoted $\Sigma \equiv \Sigma'$, if 1. (Soundness) Every database A over σ satisfying Σ when restricted to only those relations in σ' yields a database A' over σ' that satisfies Σ', and 2. (Completeness) Every database A' over σ' satisfying the constraints Σ' can be extended to a database A over σ satisfying the constraints Σ by adding new relations in σ−σ' (not limited to the domain of A').

Consider another example where the set of constraints $$\Sigma := \{R \subseteq S, S \subseteq T\}$$

is equivalent to the set of constraints $\Sigma' := \{R \subseteq T\}$.

Given this definition, the composition problem can be restated as follows. Given a set of constraints $\Sigma_{12}$ over $\sigma_1 \cup \sigma_2$ and a set of constraints $\Sigma_{23}$ over $\sigma_2 \cup \sigma_3$, find a set of constraints $\Sigma_{13}$ over $\sigma_1 \cup \sigma_3$ such that $\Sigma_{12} \cup \Sigma_{23} \equiv \Sigma_{13}$.

Figure 4:
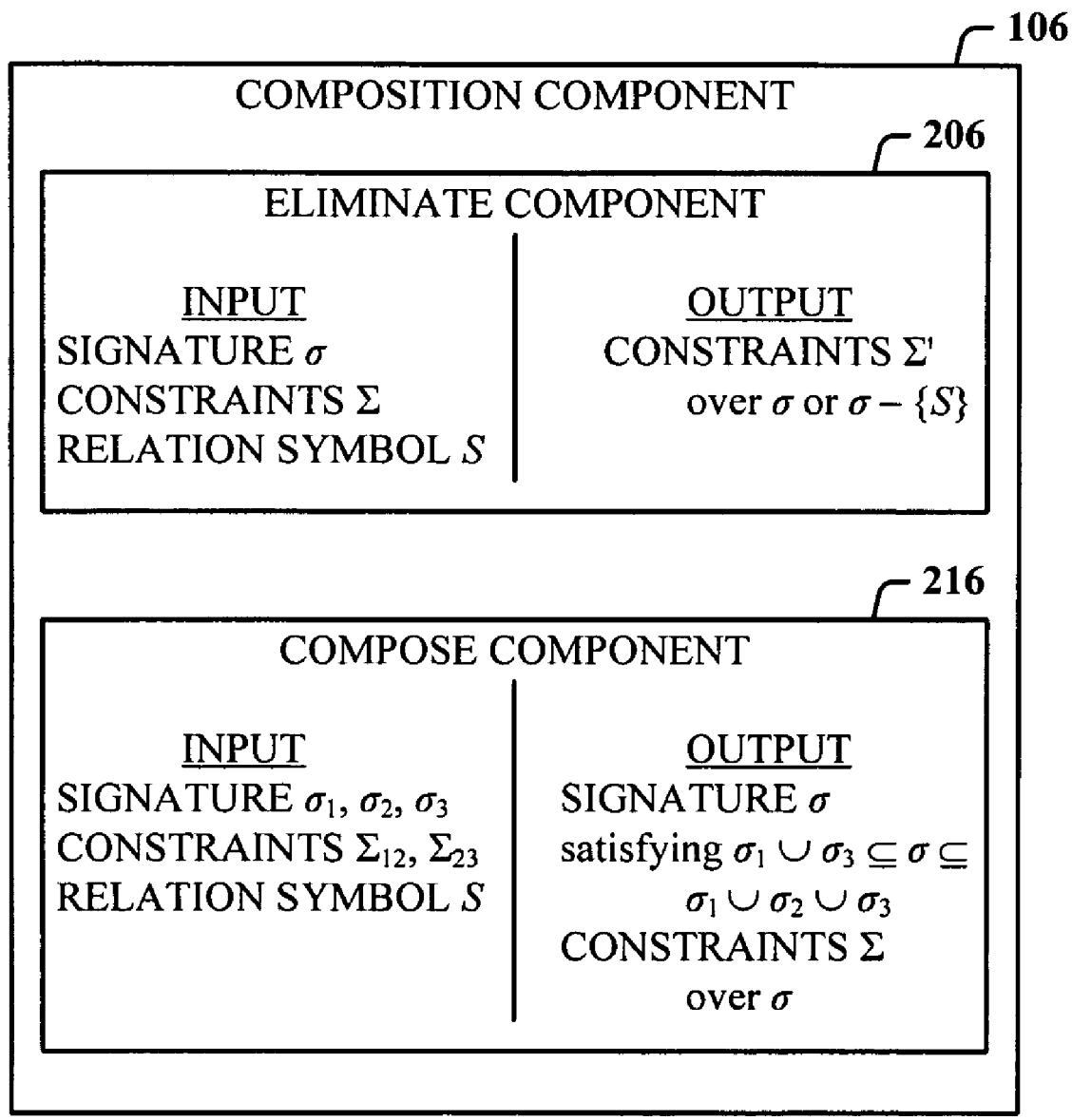
FIG. 4 illustrates a more detailed representation of an eliminate component and compose component of FIG. 2 of the composition component in support of relational algebraic composition processing.
Figure 5:
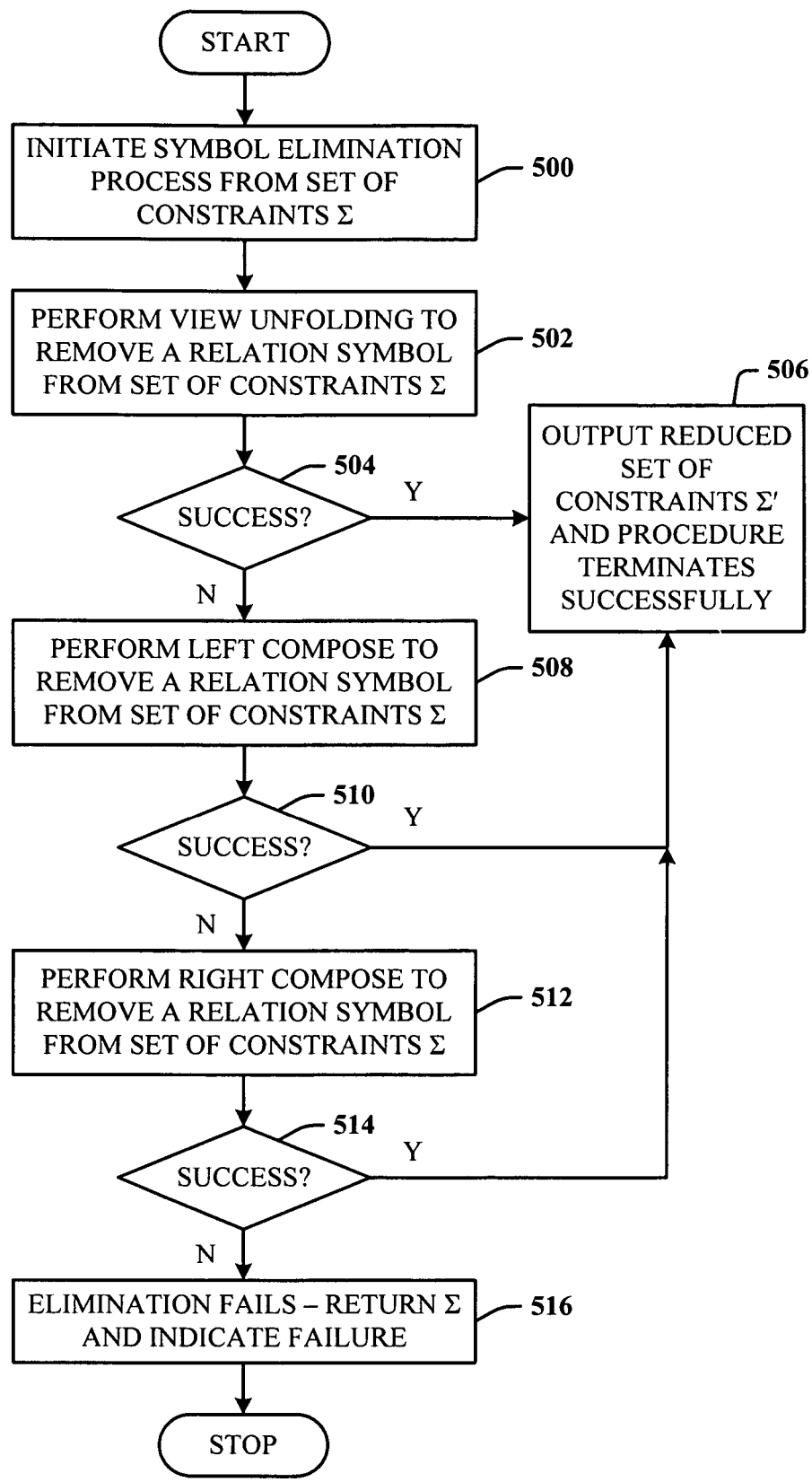
FIG. 5 illustrates a method of symbol elimination processing according to the ELIMINATE procedure.
Figure 6:
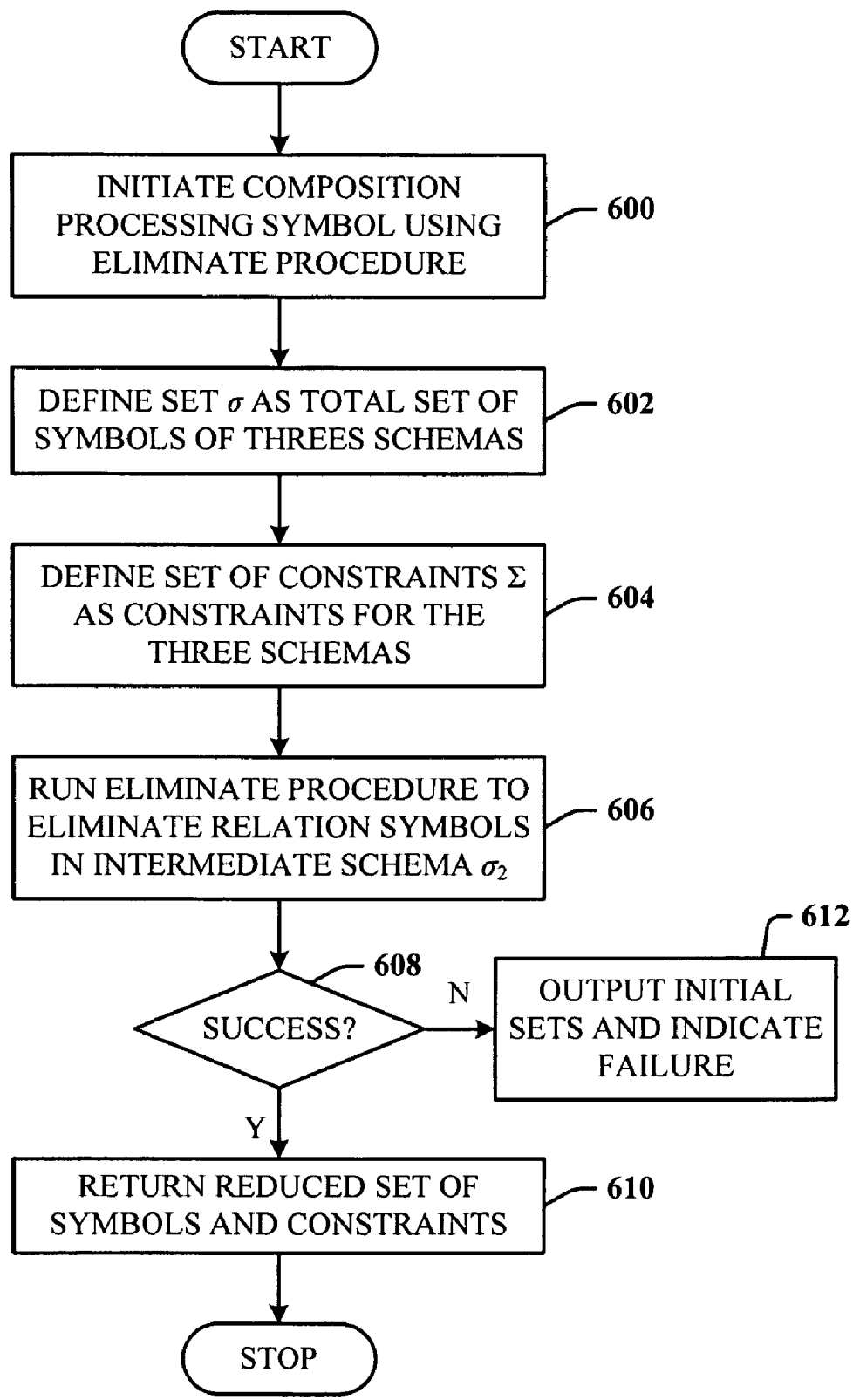
FIG. 6 illustrates a method of composition processing according to the COMPOSE procedure.

FIGS. 4-6 describe procedures for elimination and composition employed by the composition component 106 in one implementation of the algebraic algorithm.

FIG. 4 illustrates a more detailed representation of the eliminate component 206 and compose component 216 of FIG. 2 of the composition component 106 in support of relational algebraic composition processing. The eliminate component 206 includes an ELIMINATE procedure that takes as input: Signature σ, Constraints Σ, and Relation Symbol S, and outputs Constraints Σ' over Σ or Σ−{S}. The compose component 216 includes a COMPOSE procedure that takes as inputs: Signatures $\sigma_1$, $\sigma_2$, $\sigma_3$, Constraints $\Sigma_{12}$, $\Sigma_{23}$, and Relation Symbol S, and outputs Signature σ, satisfying $\sigma_1 \cup \sigma_3 \subseteq \sigma \subseteq \sigma_1 \cup \sigma_3$ and Constraints Σ over σ.

FIG. 5 illustrates a method of symbol elimination processing according to the ELIMINATE procedure. At the heart of the algebraic composition algorithm, the ELIMINATE procedure takes as input a finite set of constraints Σ over some schema σ that includes the relation symbol S and which produces as output another finite set of constraints Σ' over σ−{S} such that $\Sigma' \equiv \Sigma$, or reports the failure to do so. On success, it is said that S has been eliminated from Σ. As described in detail infra, symbol elimination employs view unfolding, left compose, and right compose. Thus, steps can be employed in the procedure to perform such operations.

Presented as a flow diagram, the procedure begins at 500, where the symbol elimination process is initiated for the input set of constraints Σ. At 502, a view unfolding step is performed to remove a relational symbol from the set of constraints Σ. If the view unfolding method is successful in eliminating a symbol, as checked at 504, flow is to 506 where the ELIMINATE procedure outputs the reduced set of constraints Σ, and terminates successfully.

If view unfolding is not successful, flow is from 504 to 508 to perform a left compose step to attempt to remove a symbol from the input set of constraints Σ. If successful, as checked at 510, flow is to 506, to again, output the reduced set of constraints Σ', and ELIMINATE terminates successfully. If left compose fails to remove a symbol, flow is from 510 to 512 to perform a right compose step to attempt removal of a symbol from the input set of constraints Σ. If successful, as checked at 514, flow is to 506 to output the reduced set of constraints Σ' and terminate the ELIMINATE procedure. If not successful, flow is from 514 to 516 where symbol elimination fails, the input set of constraints Σ is returned, and a failure signal is provided. Listed simplistically as a set of steps,

```
1. Σ' := VIEWUNFOLD(Σ, S). On success, return Σ'.
2. Σ' := LEFTCOMPOSE(Σ, S). On success, return Σ'.
3. Σ' := RIGHTCOMPOSE(Σ, S). On success, return Σ'.
4. Return Σ, and indicate failure.
```

Given the procedure ELIMINATE, several choices can be made on how to implement COMPOSE, which takes as input three schemas $\sigma_1$, $\sigma_2$, and $\sigma_3$ and two sets of constraints $\Sigma_{12}$ and $\Sigma_{23}$ over $\sigma_1 \cup \sigma_2$ and $\sigma_2 \cup \sigma_3$, respectively. A goal of COMPOSE is to return a set of constraints $\Sigma_{13}$ over $\sigma_1 \cup \sigma_3$. That is, the goal is to eliminate the relation symbols from $\sigma_2$. Since this may not be possible, strive to eliminate from $\Sigma := \Sigma_{12} \cup \Sigma_{23}$ a set S of relation symbols in $\sigma_2$ that is as large as possible or which is maximal under some other criterion than the number of relation symbols in it. There are several choices about how to do this. In one implementation, follow a user-specified ordering on the relation symbols in $\sigma_2$ and make a best-effort attempt to eliminate as many symbols as possible in that order. Note that the symbols that will be eliminated, in general, depend on this user-defined order.

FIG. 6 illustrates a method of composition processing according to the COMPOSE procedure. At 600, a composition process using the ELIMINATE procedure is initiated. At 602, a set σ is defined as the total set of symbols of three schemas $\sigma_1$, $\sigma_2$, and $\sigma_3$. At 604, a set of constraints Σ is defined as the constraints over schemas $\sigma_1$ and $\sigma_2$ (as $\Sigma_{12}$) and over schemas $\sigma_2$ and $\sigma_3$ (as $\Sigma_{23}$). At 606, the elimination procedure is run for every relation symbol S included in schema $\sigma_2$. If successful, as checked at 608, the reduced set of symbols and constraints is returned, as indicated at 610. If not successful, flow is from 608 to 612 to return the initial sets σ and Σ, and report the failure. Written as a list of steps,

```
1. Set σ := σ₁ ∪ σ₂ ∪ σ₃.
2. Set Σ = Σ₁₂ ∪ Σ₂₃.
3. For every relation symbol S ∈ σ₂ do:
4.     Σ := ELIMINATE(σ, Σ, S)
5.     On success, set σ := σ − {S}.
6. Return σ, Σ.
```

The following description focuses on ELIMINATE, since this procedure is the core of the elimination process. As indicated above, the procedure includes the following three steps: view unfolding, left compose, and right compose, each of which will be described in greater detail below.

Each of the steps attempts to remove S from Σ. If any of the steps succeeds, ELIMINATE terminates successfully. Otherwise, ELIMINATE fails. All three steps work in essentially the same way: given a constraint that contains S alone on one side of a constraint and an expression E on the other side, the steps substitute E for S in all other constraints.

Consider three one-line examples of how each of these three steps transforms a set of two constraints into an equivalent set with just one constraint:

1. $S = R \times T$, $\pi(U) - S \subseteq U \Rightarrow \pi(U) - (R \times T) \subseteq U$
2. $R \subseteq S \cap V$, $S \subseteq T \times U \Rightarrow R \subseteq (T \times U) \cap V$
3. $T \times U \subseteq S$, $S - \pi(U) \subseteq R \Rightarrow (T \times U) - \pi(U) \subseteq R$ To perform such a substitution, an expression is needed that contains S alone on one side of a constraint. This holds in the example, but is typically not the case. Another feature of the algorithm is that it performs normalization as necessary to put the constraints into such a form. In the case of left and right compose, all other expressions that contain S can be monotone in S. Providing a more detailed technical overview of the three steps just introduced, to simplify the discussion below, $\Sigma_0 := \Sigma$ is the input to ELIMFNATE and $\Sigma_s$ is the result after step s is complete. E, $E_1$, $E_2$ are used to represent arbitrary relational expressions and M(S) represents a relational expression monotonic in S.

Figure 7:
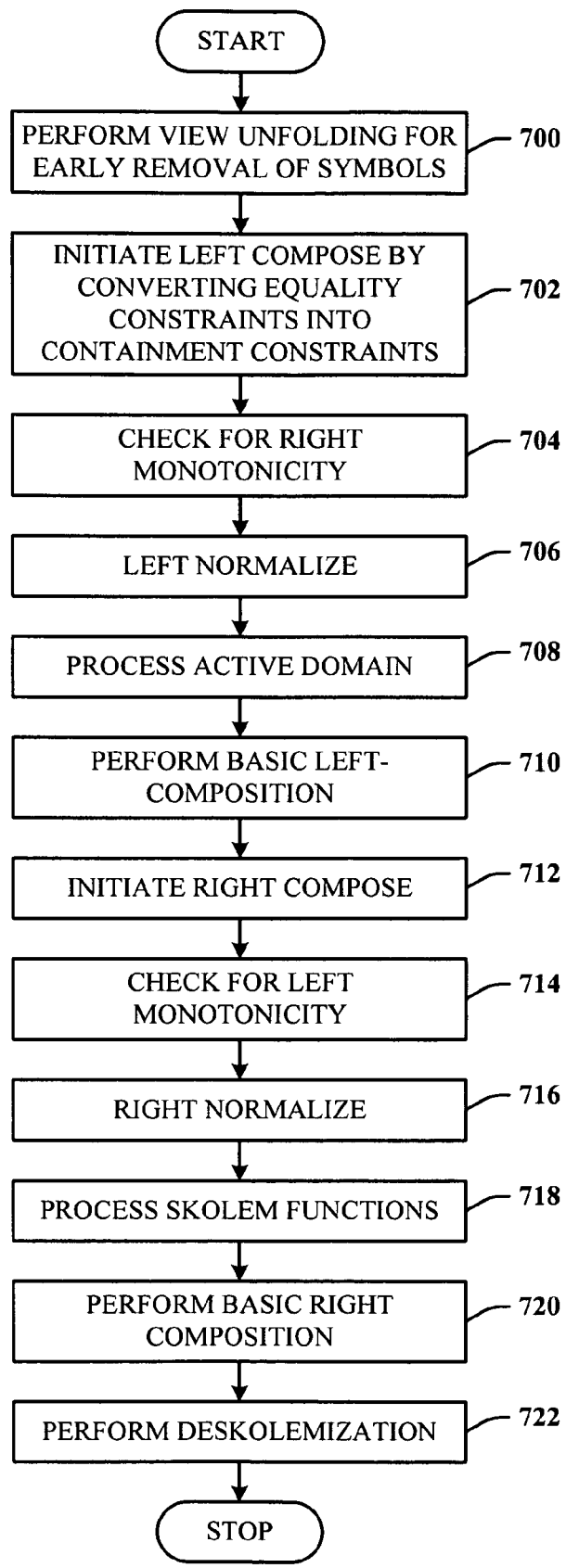
FIG. 7 illustrates a detailed method of symbol elimination using view unfolding, left compose and right compose as part of algebraic composition processing.

FIG. 7 illustrates a method of symbol elimination using view unfolding, left compose and right compose as part of algebraic composition processing. At 700, symbol elimination begins with view unfolding for the early removal of symbols. More specifically, look for a constraint ξ of the form $S = E_1$ in $\Sigma_0$, where $E_1$ is an arbitrary expression that does not contain S. If there is no such constraint, set $\Sigma_1 := \Sigma_0$ and perform left compose. Otherwise, to obtain $\Sigma_1$ remove ξ and replace every occurrence of S in every other constraint in $\Sigma_0$ with $E_1$. Then $\Sigma_1 \equiv \Sigma_0$. Soundness is straight forward and to show completeness, it is enough to set $S = E_1$.

At 702, left compose is initiated by converting equality constraints into containment constraints. More specifically, if S appears on both sides of some constraint in $\Sigma_1$, then exit. Otherwise, convert every equality constraint $E_1 = E_2$ that contains S into two containment constraints $E_1 \subseteq E_2$ and $E_2 \subseteq E_1$ to obtain $\Sigma'_1$.

At 704, right monotonicity is performed by checking $\Sigma'_1$ for right-monotonicity in S. In other words, check whether every expression E in which S appears to the right of a containment constraint is monotonic in S. If this check fails, then set $\Sigma_2 := \Sigma'_1$ and perform right compose.

At 706, left-normalize is performed for every constraint in $\Sigma'_1$ for S to obtain $\Sigma''_1$. That is, replace all constraints in which S appears on the left with a single equivalent constraint ξ of the form $S \subseteq E_1$. That is, S appears alone on the left in ξ. This is not always possible; if it fails, set $\Sigma_2 := \Sigma'_1$ and perform right compose.

If S does not appear on the left of any constraint, then add to $\Sigma''_1$ the constraint ξ: $S \subseteq E_1$ and set $E_1 := D^r$, where r is the arity of S. Here, D is a special symbol which stands for the active domain. Clearly, any S satisfies this constraint. Accordingly, at 708, process the active domain.

Now, to obtain $\Sigma'''_1$ from $\Sigma''_1$, remove ξ, and for every constraint in $\Sigma''_1$ of the form $E_2 \subseteq M(S)$ where M is monotonic in S, put a constraint of the form $E_2 \subseteq M(E_1)$ in $\Sigma'''_1$. This is called basic left-composition, as indicated at 710. Finally, to the extent that knowledge of the operators allows, attempt to eliminate $D^r$ (if introduced) from any constraints, to obtain $\Sigma_2$. For example $E_1 \cap D^r$ becomes $E_1$. Then $\Sigma_2 \equiv \Sigma_1$. Soundness follows from monotonicity since $E_2 \subseteq M(S) \subseteq M(E_1)$ and to show completeness it is enough to set $S := E_1$.

At 712, right compose is initiated. Right compose is a dual to left-compose. In other words, check for left-monotonicity at 714, and right-normalize, at 716, as done previously, to obtain $\Sigma''_2$ with a constraint ξ of the form $E_1 \subseteq S$. If S does not appear on the right of any constraint, then add to $\Sigma''_2$ the constraint ξ:$E_1 \subseteq S$ and set $E_1 := \emptyset$. Clearly, any S satisfies this constraint.

In order to handle projection during the normalization step, Skolem functions can be introduced, as indicated at 718. For example, $R \subseteq \pi_1(S)$, where R is unary and S is binary becomes $f(R) \subseteq S$. The expression $f(R)$ is binary and denotes the result of applying some unknown Skolem function f to the expression R. The right-normalization step 716 should always succeed for select, project, and join, but can fail for other operators. If normalization fails, set $\Sigma_3 := \Sigma_2$ and exit.

Now, at 720, to obtain $\Sigma'''_2$ from $\Sigma'_2$ remove $\xi$ and for every constraint in $\Sigma'_2$ of the form $M(S) \subseteq E_2$ where M is monotonic in S, put a constraint of the form $M(E_1) \subseteq E_2$ in $\Sigma'''_2$. This is called basic right-composition. Finally, to the extent that knowledge of the operators allows, attempt to eliminate $\emptyset$ (if introduced) from any constraints, to obtain $\Sigma_3$. For example $E_1 \cup \emptyset$ becomes $E_1$.

Then $\Sigma'''_2 \equiv \Sigma_2$. Soundness follows from monotonicity since $M(E_1) \subseteq M(S) \subseteq E_2$ and to show completeness it is enough to set $S := E_1$.

Since during normalization Skolem functions may have been introduced, use a right-denormalization step to remove such Skolem functions (called deskolemization), as indicated at 722. Deskolemization is very complex and may fail. If it does, set $\Sigma_3 := \Sigma_2$ and exit. Otherwise, set $\Sigma_3$ to be the result of deskolemization.

The goal of the view unfolding is to eliminate S at an early stage. It takes as input a set of constraints $\Sigma_0$ and a symbol S to be eliminated. It produces as output an equivalent set of constraints $\Sigma_1$ with S eliminated (in the success case), or returns $\Sigma_0$ (in the failure case). The step proceeds as follows. Look for a constraint $\xi$ of the form $S=E_1$ in $\Sigma_0$ where $E_1$ is an arbitrary expression that does not contain S. If there is no such constraint, set $\Sigma_1 := \Sigma_0$ and report failure. Otherwise, to obtain $\Sigma_1$, remove $\xi$ and replace every occurrence of S in every other constraint in $\Sigma_0$ with $E_1$. Note that S may occur in expressions that are not necessarily monotone in S, or that contain user-defined operators about which little is known. In either case, because S is defined by an equality constraint, the result is still an equivalent set of constraints. This is in contrast to left compose and right compose, which rely for correctness on the monotonicity of expressions in S when performing substitution.

Consider the following example where the input constraints are given by $S = R_1 \times R_2, \pi(R_3 - S) \subseteq T_1, T_2 \subseteq T_3 - \sigma_c(S)$.

Then unfold views deletes the first constraint and substitutes $R_1 \times R_2$ for S in the second two constraints, producing $\pi(R_3 - (R_1 \times R_2)) \subseteq T_1, T_2 \subseteq T_3 - \sigma_c(R_1 \times R_2)$.

Note that in this example, neither left compose nor right compose would succeed in eliminating S. Left compose would fail because the expression $T_3 - \sigma_c(S)$ is not monotone in S. Right compose would fail because the expression $\pi(R_3 - S)$ is not monotone in S. Therefore, view unfolding does indeed provide some extra power compared to left compose and right compose alone.

Figure 8:
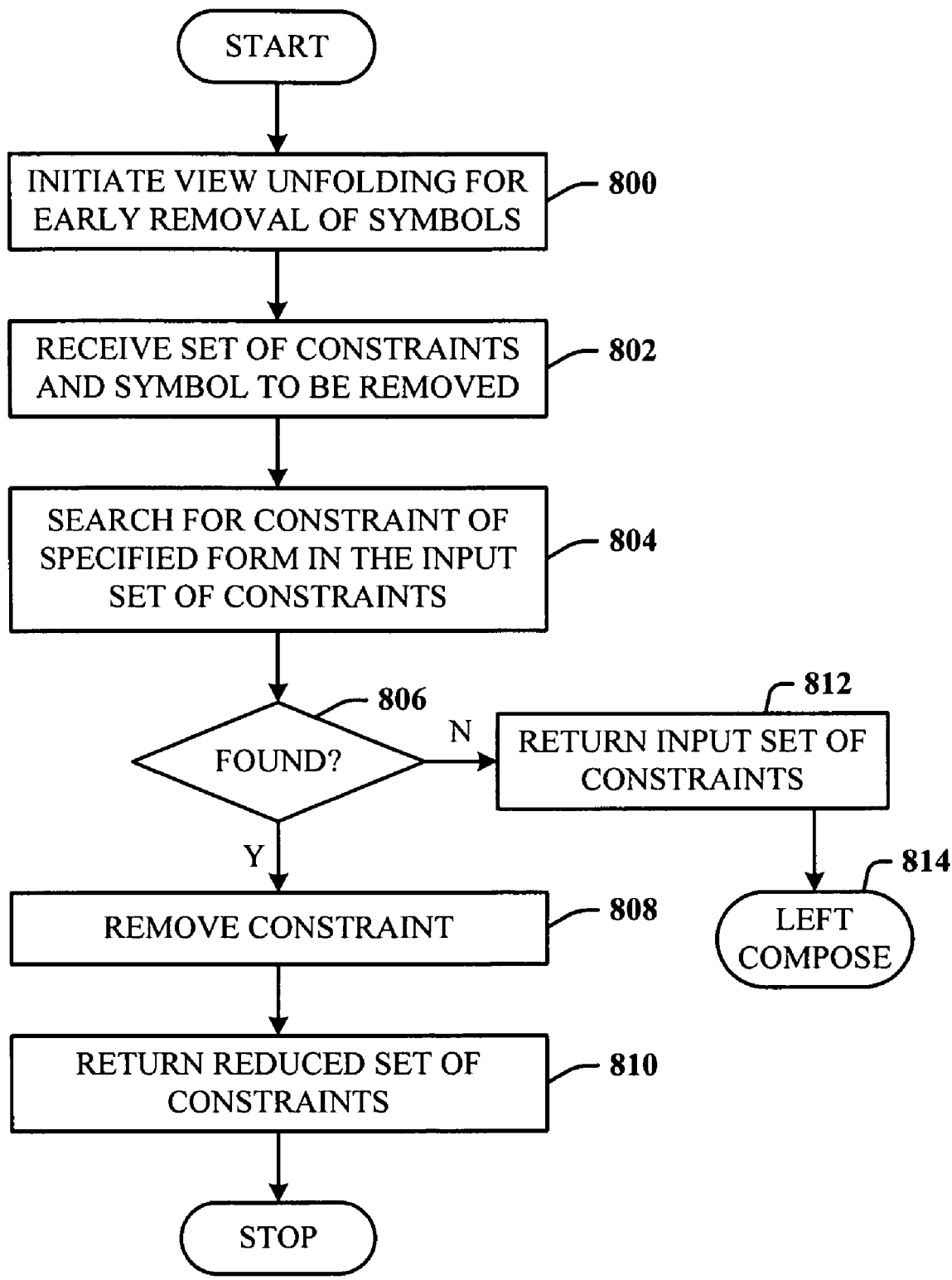
FIG. 8 illustrates a method of symbol elimination according to view unfolding.

FIG. 8 illustrates a detailed method of symbol elimination according to view unfolding. At 800, view unfolding is initiated for early removal of symbols. At 802, a set of constraints and symbol to be removed are received. At 804, search for constraint of the form $S=E_1$ in the input set of constraints. If, at 806, there is a constraint, remove it from the input set of constraints, as indicated at 808. Then, at 810, return the reduced set of constraints. On the other hand, at 806, no such constraint is found, the input set of constraints is returned, as indicated at 812, and flow is to perform left compose, at 814.

The correctness of performing substitution to eliminate a symbol S in the left compose and right compose steps depends upon the left-hand side (lhs) or right-hand side (rhs) of all constraints being monotone in S. Now described is a sound but incomplete procedure called MONOTONE for checking this monotonicity. MONOTONE takes as input an expression E and a symbol S. It returns 'm' if the expression is monotone in S, 'a' if the expression is anti-monotone in S, 'i' if the expression is independent of S (for example, because it does not contain S), and 'u' (unknown) if it cannot determine how the expression depends on S. For example, given the expression $S \times T$ and symbol S as input, MONOTONE returns 'm', while given the expression $\sigma_{c_1}(S) - \sigma_{c_2}(S)$ and for the symbol S, MONOTONE returns 'u'.

The procedure is defined recursively in terms of the six basic relational operators. In the base case, the expression is a single relational symbol, in which case MONOTONE returns 'm' if that symbol is S, and 'i' otherwise. Otherwise, in the recursive case, MONOTONE first calls itself recursively on the operands of the top-level operator, and then performs a simple table lookup based on the return values and the operator. For the unary expressions $\sigma(E_1)$ and $\pi(E_1)$, MONOTONE($\sigma(E_1)$, S)=MONOTONE($\pi(E_1)$, S)=MONOTONE($E_1$, S) (in other words, $\sigma$ and $\pi$ do not affect the monotonicity of the expression). Otherwise, for the binary expressions $E_1 \cup E_2, E_1 \cap E_2, E_1 \times E_2$, and $E_1 - E_2$, there are sixteen cases to consider, corresponding to the possible values of MONOTONE($E_1$, S) and MONOTONE($E_2$, S).

Note that $\times, \cap,$ and $\cup$ all behave in the same way from the point of view of MONOTONE, that is, MONOTONE($E_1 \cup E_2$, S)=MONOTONE($E_1 \cap E_2$, S)=MONOTONE($E_1 \times E_2$, S), for all $E_1$, $E_2$. Set difference $-$, on the other hand, behaves differently than the other cases.

In order to support user-defined operators in MONOTONE, simply provide the rules regarding monotonicity of the operator in S, given the monotonicity of its operands in S. Once these rules have been added to the appropriate tables, MONOTONE supports the user-defined operator automatically.

Figure 9:
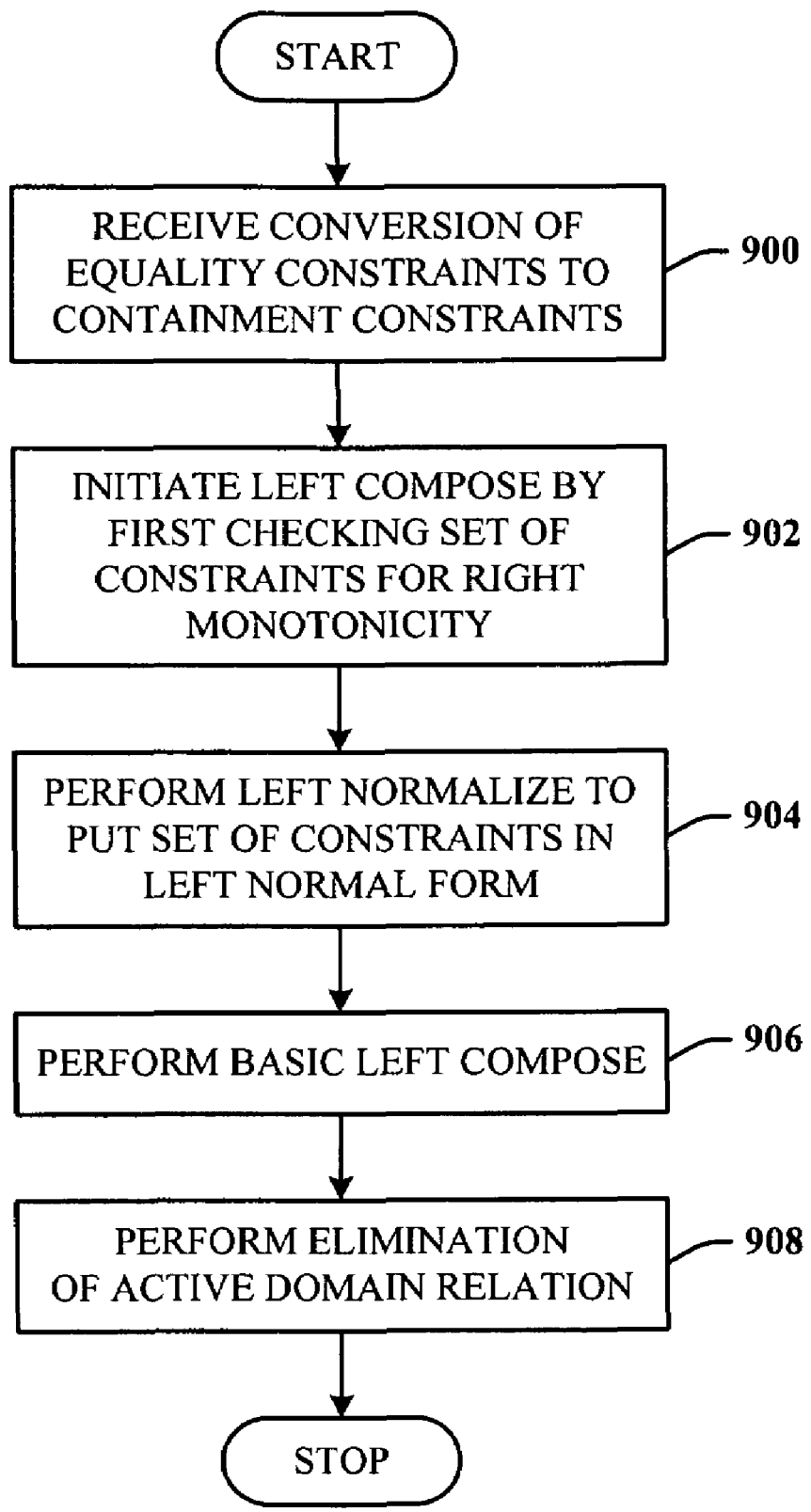
FIG. 9 illustrates a method of left compose for symbol removal from constraints.

FIG. 9 illustrates a method of left compose for symbol removal from constraints. Once equality constraints have been converted to containment constraints, indicated at 900, left compose consists of four main steps. First, at 902, check the constraints for right monotonicity in S, that is, to check whether every expression E in which S appears to the right of a containment constraint is monotonic in S. At 904, perform left normalize to put the set of input constraints in a left normal form. At 906, perform basic left compose, and then eliminate the active domain relation, as indicated at 908.

Following is a detailed description of these steps and examples to illustrate step operation. A goal of left normalize is to put the set of input constraints in a form such that the symbol S to be eliminated appears on the left of exactly one constraint, which is of the form $S \subseteq E_2$. When accomplished, it is said that the constraints are in left normal form. In contrast to right normalize, left normalize does not always succeed even on the basic relational operators. Nevertheless, left composition is useful because it can succeed in cases where right composition fails for other reasons. An example of this in presented infra. The following identities are presented for containment constraints in left normalize (note that here again the subscripts of the projection operator $\pi$ are omitted for readability):

$\cup: E_1 \cup E_2 \subseteq E_3 \leftrightarrow E_1 \subseteq E_3, E_2 \subseteq E_3$ $-: E_1 - E_2 \subseteq E_3 \leftrightarrow E_1 \subseteq E_2 \cup E_3$ $\pi: \pi(E_1) \subseteq E_2 \leftrightarrow E_1 \subseteq E_2 \times D^r$ $\sigma: \sigma_c(E_1) \subseteq E_2 \leftrightarrow E_1 \subseteq E_2 \cup (D^r - \sigma_c(D^r))$ To each identity in the list, a rewriting rule is associated that takes a constraint of the form given by the lhs of the identity and produces an equivalent constraint or set of constraints of the form given by the rhs of the identity. For example, from the identity for σ a rule is obtained that matches a constraint of the form $\sigma_c(E_1) \subseteq E_2$ and rewrites it into equivalent constraints of the form $E_1 \subseteq E_2 \cup (D^r - \sigma_c(D^r))$. Note that there is at most one rule for each operator. To find the rule that matches a particular expression, the rule corresponding to the topmost operator in the expression can be looked up.

Note that in addition to the basic relational operators, left normalize can be extended to handle user-defined operators by specifying a user-defined rewriting rule for each such operator.

Left normalize proceeds as follows. Let $\Sigma_1$ be the set of input constraints, and let S be the symbol to be eliminated from $\Sigma_1$. Left normalize computes a set $\Sigma'_1$ of constraints as follows. Set $\Gamma_1 := \Sigma_1$. The method loops as follows, beginning at i=1. In the ith iteration, there are two cases:

1. If there is no constraint in $\Gamma_i$ that contains S on the lhs in a complex expression, set $\Sigma'$, to be $\Gamma_i$ with all the constraints containing S on the lhs collapsed into a single constraint, which has an intersection of expressions on the right. For example, $S \subseteq E_1, S \subseteq E_2$ becomes $S \subseteq E_1 \cap E_2$. If S does not appear on the lhs of any expression, add to $\Sigma'_1$, the constraint $S \subseteq D^r$ where r is the arity of S. Finally, return success.
2. Otherwise, choose some constraint $\xi := E_1 \subseteq E_2$, where $E_1$ contains S. If there is no rewriting rule for the top-level operator in $E_1$, set $\Sigma'_1 := \Sigma_1$ and return failure. Otherwise, set $\Gamma_{i+1}$ to be the set of constraints obtained from $\Gamma_i$ by replacing $\xi$ with its rewriting, and iterate.

Consider an example where the input constraints are given by $$R - S \subseteq T, \pi(S) \subseteq U$$

and where S is the symbol to be eliminated. Then left normalization succeeds and returns the constraints $$R \subseteq S \cup T, S \subseteq U \times D^r.$$

Consider another example where the input constraints are given by $$R \cap S \subseteq T, \pi(S) \subseteq U.$$

Then left normalization fails, because there is no rule matching the lhs of $R \cap S \subseteq T$.

Consider yet another example where the input constraints are given by $$R \cap T \subseteq S, U \subseteq \pi(S).$$

Since there is no constraint containing S on the left, left normalize adds the trivial constraint $S \subseteq D^r$, producing $$R \cap T \subseteq S, U \subseteq \pi(S), S \subseteq D^r.$$

Among the constraints produced by left normalize, there is a single constraint $\xi := S \subseteq E_1$ that has S on its lhs. In basic left compose, remove $\xi$ from the set of constraints, and replace every other constraint of the form $E_2 \subseteq M(S)$, where M(S) is monotonic in S, with a constraint of the form $E_2 \subseteq M(E_1)$. Following are examples that illustrate this.

Consider the one set of constraints from above after left normalization:

$$R \subseteq S \cup T, S \subseteq U \times D^r.$$

The expression $S \cup T$ is monotone in S. Therefore, left compose to obtain $$R \subseteq (U \times D^r) \cup T.$$

Note although the input constraints could just as well be put in right normal form, right compose would fail, because the expression R−S is not monotone in S. Thus, left compose does indeed provide some additional power in the algorithm.

Continuing with another set of constraints from above, as shown below:

$$R \cap T \subseteq S, U \subseteq \pi(S), S \subseteq D^r.$$

left compose and obtain $$R \cap T \subseteq D^r, U \subseteq \pi(D^r).$$

Note that the active domain relation D occurs in these constraints. Following is a description of how to eliminate the active domain relation.

Left compose can produce a set of constraints containing the symbol D which represents the active domain relation. A goal is to eliminate D from the constraints, to the extent that knowledge of the operators allows, which may result in entire constraints disappearing in the process as well. Rewriting rules derived from the following identities for the basic relational operators are used:

$$E_1 \cup D^r = D_r, E_1 \cap D^r = E_1$$

$$E_1 - D^r = \emptyset, \pi_I(D^r) = D^{|I|}$$

In addition, the user may supply rewriting rules for user-defined operators, which can be used if present. The constraints are rewritten using these rules until no rule applies. At this point, D may appear alone on the rhs of some constraints. This can simply be deleted, since a constraint of this form is satisfied by any instance. Note that eliminating D from the constraints is not always successful. However, this is acceptable, since a constraint containing D can still be checked.

Continuing with the following constraints:

$$R \cap T \subseteq D^r, U \subseteq \pi(D^r),$$

first apply the domain relation rewriting rules, yielding $$R \cap T \subseteq D^r, U \subseteq D^k,$$

where k is the arity of $\pi(D^r)$. Then, since both of these constraints have the domain relation alone on the rhs, the constraints can be deleted.

Figure 10:
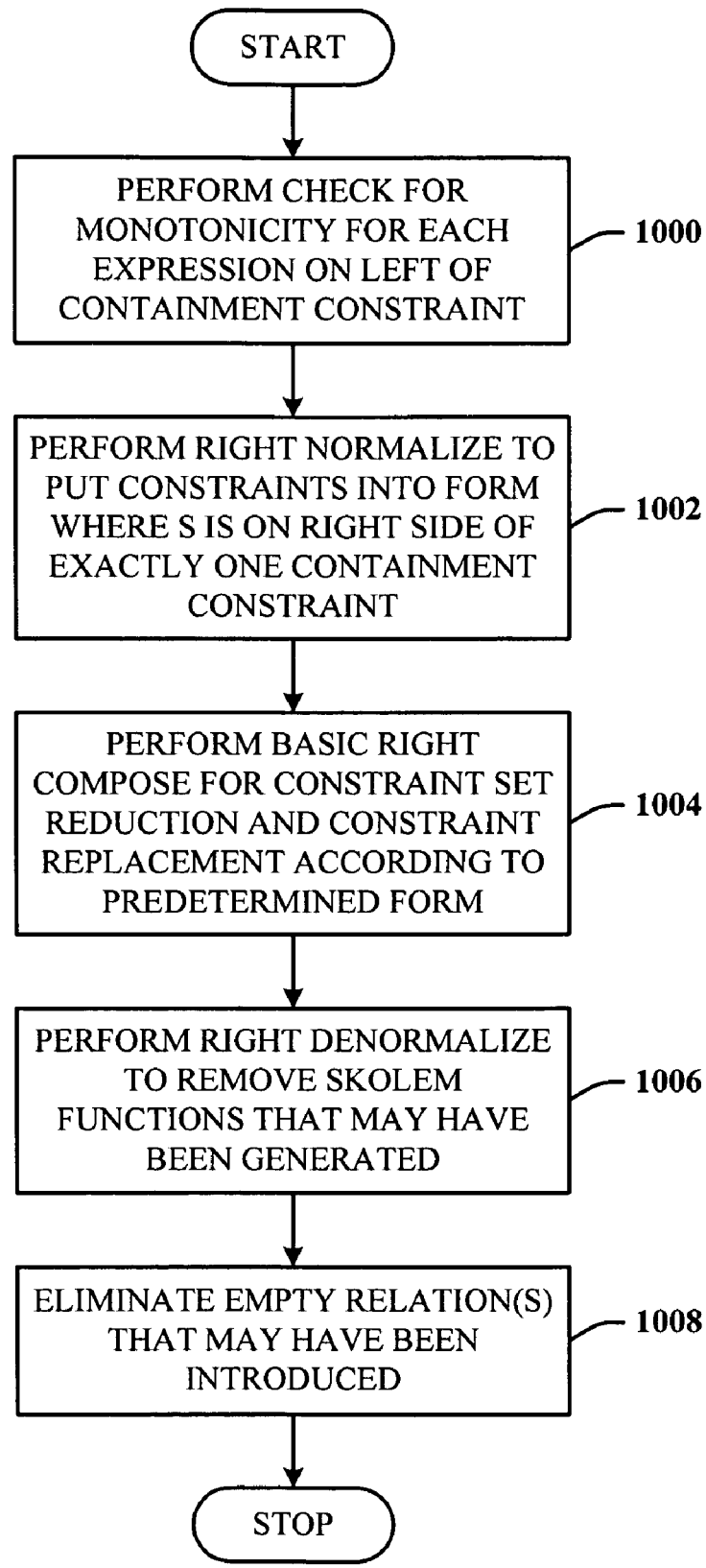
FIG. 10 illustrates a method of a right compose for symbol removal from constraints.

Right compose proceeds through five main steps. FIG. 10 illustrates a method of right compose for symbol removal from constraints. At 1000, a check is performed to ensure monotonicity, or more specifically, that every expression E that appears to the left of a containment constraint is monotonic in S. The procedure for checking this is described supra. At 1002, a next process is to perform a right normalize to place constraints into a form where S appears on the rhs of exactly one containment constraint (e.g., of the form $E_1 \subseteq S$). At 1004, the procedure performs a basic right compose for constraint set reduction and constraint replacement according to a predetermined form. At 1006, a right denormalize step is performed to remove Skolem functions, if any are present. At 1008, empty relations are eliminated, if such relations are introduced during the right compose procedure. The right compose procedure will now be described in greater detail.

Right normalize is a dual to left normalize. A goal of right normalize is to put the constraints in a form where S appears on the rhs of exactly one constraint, which has the form $E_1 \subseteq S$. After right normalize, it is said that the constraints are then in right normal form. The following identities are utilized for containment constraints in right normalization (note that here again the subscripts of the projection operator π are omitted for readability):

| | | | |
|---|---|---|---|
| ∪: | $E_1 \subseteq E_2 \cup E_3$ | ↔ | $E_1 - E_3 \subseteq E_2$ |
| | | ↔ | $E_1 - E_2 \subseteq E_3$ |
| ∩: | $E_1 \subseteq E_2 \cap E_3$ | ↔ | $E_1 \subseteq E_2, E_1 \subseteq E_3$ |
| ×: | $E_1 \subseteq E_2 \times E_3$ | ↔ | $\pi(E_1) \subseteq E_2, \pi(E_1) \subseteq E_2$ |
| −: | $E_1 \subseteq E_2 - E_3$ | ↔ | $E_1 \subseteq E_2, E_1 \cap E_3 \subseteq \emptyset$ |
| π: | $E_1 \subseteq \pi(E_2)$ | ↔ | $f(E_1) \subseteq E_2$ |
| σ: | $E_1 \subseteq \sigma_c(E_2)$ | ↔ | $E_1 \subseteq E_2, E_1 \subseteq \sigma_c(D')$ |

As in left normalize, with each identity in the list, a rewriting rule is associated that takes a constraint of the form given by the lhs of the identity and produces an equivalent constraint or set of constraints of the form given by the rhs of the identity. For example, from the identity for σ a rule is obtained that matches constraints of the form $E_1 \subseteq \sigma_c(E_2)$ and produces the equivalent pair of constraints $E_1 \subseteq E_2$ and $E_1 \subseteq \sigma_c(D')$. As with left normalize, there is at most one rule for each operator. To find the rule that matches a particular expression, it is only needed to look up the rule corresponding to the topmost operator in the expression. In contrast to the rules used by left normalize, there is a rule in this list for each of the six basic relational operators. Therefore, right normalize always succeeds when applied to constraints that use only basic relational expressions.

Just as with left normalize, user-defined operators can be supported via user-specified rewriting rules. If there is a user-defined operator that does not have a rewriting rule, then right normalize may fail in some cases.

Note that the rewriting rule for the projection operator π may introduce Skolem functions. The deskolemize step will later attempt to eliminate any Skolem functions introduced by this rule. If additional information is known about key constraints for the base relations, this can be used to minimize the list of attributes on which the Skolem function depends. This increases the chances of success in deskolemize.

Right normalize proceeds as follows. Let $\Sigma_2$ be the set of input constraints, and let S be the symbol to be eliminated from $\Sigma_2$. Right normalize computes a set $\Sigma'_2$ of constraints as follows. Set $\Gamma_i := \Sigma_2$. Loop as follows, beginning at i=1. In the ith iteration, there are two cases:

1. If there is no constraint in $\Gamma_i$ that contains S on the rhs in a complex expression, set $\Sigma'_2$ to be the same as $\Gamma_i$ but with all the constraints containing S on the rhs collapsed into a single constraint containing a union of expressions on the left. For example, $E_1 \subseteq S, E_2 \subseteq S$ becomes $E_1 \cup E_2 \subseteq S$. If S does not appear on the rhs of any expression, add to $\Sigma'_2$ the constraint $\emptyset \subseteq S$. Finally, return success.
2. Otherwise, choose some constraint $\xi := E_1 \subseteq E_2$, where $E_2$ contains S. If there is no rewriting rule corresponding to the top-level operator in $E_2$, set $\Sigma'_2 := \Sigma_2$ and return failure. Otherwise, set $\Gamma_{i+1}$ to be the set of constraints obtained from $\Gamma_i$ by replacing $\xi$ with its rewriting, and iterate.

Consider in an example, the constraints given by $S \times T \subseteq U, T \subseteq \sigma_c(S) \times \pi(R).$ Right normalize leaves the first constraint alone and rewrites the second constraint, producing $S \times T \subseteq U, \pi(T) \subseteq S, \pi(T) \subseteq \sigma_c(D'), \pi(T) \subseteq \pi(R).$ Notice that rewriting stopped for the constraint $\pi(T) \subseteq \pi(R)$ immediately after it was produced, because S does not appear on its rhs.

Consider in another example, the constraints given by $R \subseteq \pi(S \times (T \cap U)), S \subseteq \sigma_c(T).$ Right normalize rewrites the first constraint and leaves the second constraint alone, producing $\pi(f(R)) \subseteq S, \pi(f(R)) \subseteq T \cap U, S \subseteq \sigma_c(T).$ Note that a Skolem function f was introduced in order to handle the projection operator. After right compose, the deskolemize procedure will attempt to get rid of the Skolem function $f$.

After right normalize, there is a single constraint $\xi := E_1 \subseteq S$ which has S on its rhs. In basic right compose, remove $\xi$ from the set of constraints, and replace every other constraint of the form $M(S) \subseteq E_2$, where $M(S)$ is monotonic in S, with a constraint of the form $M(E_1) \subseteq E_2$. The following examples will aid in understanding basic right compose.

Recall the constraints from above produced by right normalize:

$S \times T \subseteq U, \pi(T) \subseteq S, \pi(T) \subseteq \sigma_c(D'), \pi(T) \subseteq \pi(R).$ Given those constraints as input, basic right compose produces $\pi(T) \times T \subseteq U, \pi(T) \subseteq \sigma_c(D'), \pi(T) \subseteq \pi(R).$ Since the constraints contain no Skolem functions, the process is done.

Recall the constraints from another example above produced by right normalize:

$\pi(f(R)) \subseteq S, \pi(f(R)) \subseteq T \cap U, S \subseteq \sigma_c(T).$

Given those constraints as input, basic right compose produces $\pi(f(R)) \subseteq T \cap U, \pi(f(R)) \subseteq \sigma_c(T).$ Note that composition is not yet complete in this case. A process of deskolemizing the constraints will be completed to remove $f$. This process is described next.

During right-normalization, Skolem functions can be introduced in order to handle projection. For example, transform $R \subseteq \pi_1(S)$ where R is unary and S is binary to $f_1(R) \subseteq S$. The subscript "1" indicates that $f$ depends on position one of R. That is, $f_1(R)$ is a binary expression where to every value in R another value is associated by $f$. Thus, after basic right-composition, there may be constraints having Skolem functions. The semantics of such constraints is the constraints hold iff there exist some values for the Skolem functions which satisfy the constraints. An objective of the deskolemization step is to remove such Skolem functions. As described in one implementation herein, deskolemization is a complex 12-step procedure.

Figure 11:
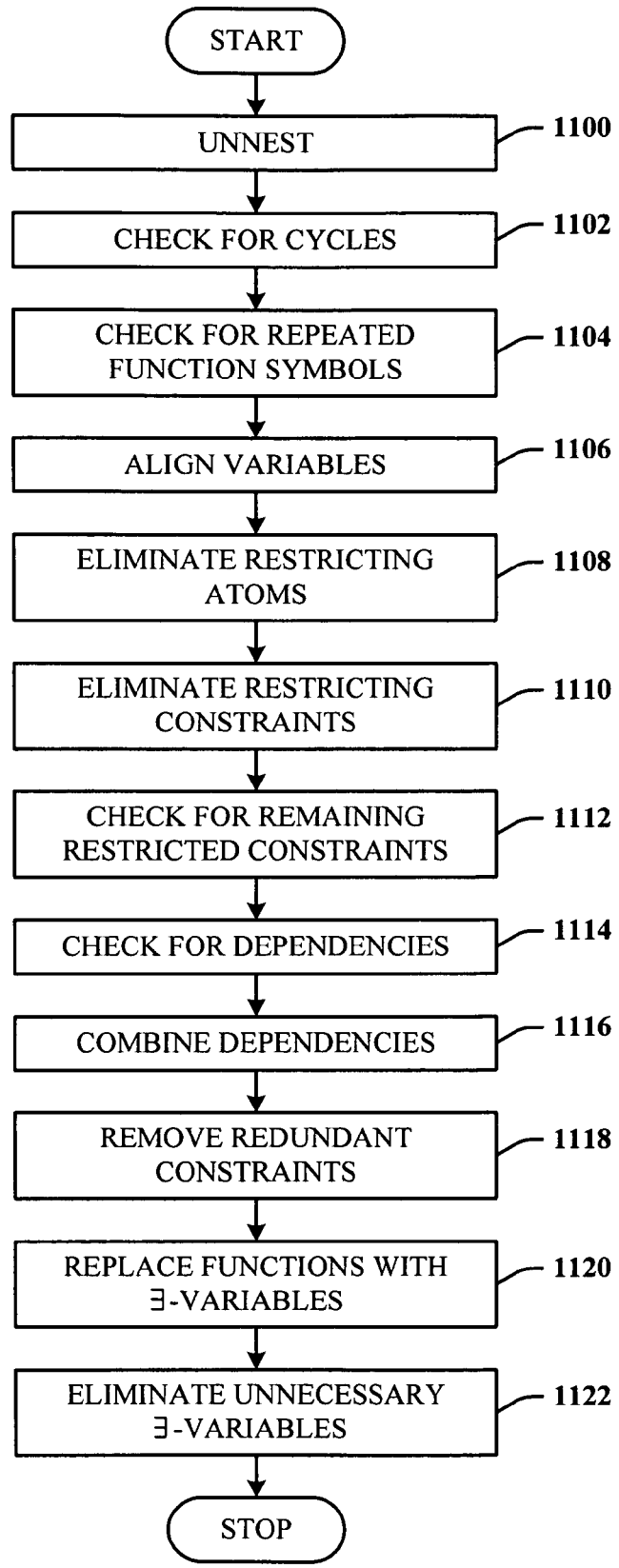
FIG. 11 illustrates a method of deskolemization according to a DESKOLEMIZE procedure for removing Skolem functions.

FIG. 11 illustrates a method of deskolemization according to a DESKOLEMIZE procedure. DESKOLEMIZE($\Sigma$) is generalized as follows. At 1100, an unnesting process is initiated for unnesting terms and eliminating terms from relational atoms. At 1102, a check for cycles is performed. If a cycle is detected, the procedure is aborted. At 1104, a check is made for repeated function symbols. If found, duplicates can be eliminated. At 1106, variable alignment is performed. If alignment is unsuccessful, the procedure aborts. At 1108, restricting atoms are eliminated. Relational atoms in which a term variable occurs are called restricting atoms. At 1110, a similar process is performed for restricting constraints. At 1112, a check is made for remaining restricting constraints. At 1114, a check for dependencies is performed. At 1116, a process of combining dependencies is performed. At 1118, redundant constraints are removed. At 1120, functions with ∃-variables are replaced. At 1122, unnecessary ∃-variables are eliminated.

Following are some aspects specific to this implementation. First of all, as has already been described, an algebra-based representation is utilized instead of a logic-based representation. A Skolem function as used herein is a relational operator which takes an r-ary expression and produces an expression of arity r+1. A goal at the end of step 3 is to produce expressions of the form $$\pi \sigma f g \ldots \sigma(R_1 \times R_2 \times \ldots \times R_k).$$

Here,

π selects which positions will be in the final expression, the outer σ selects some rows based on values in the Skolem functions, $f, g, \ldots$ is a sequence of Skolem functions, the inner σ selects some rows independently of the values in the Skolem functions, and $(R_1 \times R_2 \times \ldots \times R_k)$ is a cross product of possibly repeated base relations.

The goal of variable alignment is to make sure that across all constraints, all these expressions have the same arity for the part after the Skolem functions. This is achieved by possibly padding with the D symbol. Furthermore, the variable alignment step aligns the Skolem functions in such a way that across all constraints the same Skolem functions appear, in the same sequence. For example, given two expressions $f_1(R)$ and $g_1(S)$ with R, S being unary, alignment rewrites the expressions as $$\pi_{13} g_2 f_1 (R \times S) \text{ and } \pi_{24} g_2 f_1 (R \times S).$$

Here, R×S is a binary expression with R in position one and S in position two, and $g_2 f_1(R \times S)$ is an expression of arity four with R in position one, S in position two, $f$ in position three depending only on position one, and g in position four depending only on position two.

A goal of atom elimination, at 1108, is to eliminate the outer selection 94, and of constraint elimination, at 1110, to eliminate constraints having such an outer selection. The remaining steps correspond closely to a logic-based approach. Deskolemization is complex and may fail at several of the steps above. The following two examples illustrate some cases where deskolemization fails.

Consider the following example, using constraints where E, F, C, D are binary and $\sigma_2 = \{F,C\}$:

$$E \subseteq F, \pi_1(E) \subseteq \pi_1(C), \pi_2(E) \subseteq \pi_1(C)$$

$$\pi_{46} \sigma_{1=3,2=5}(F \times C \times C) \subseteq D$$

Right-composition succeeds at eliminating F to get $$\pi_1(E) \subseteq \pi^1(C), \pi_2(E) \subseteq \pi_1(C)$$

$$\pi_{46} \sigma_{1=3,2=5}(E \times C \times C) \subseteq D$$

Right-normalization for C yields $$\pi_{13} f_{12}(E) \subseteq (C), \pi_{23} g_{12}(E) \subseteq (C)$$

$$\pi_{46} \sigma_{1=3,2=5}(E \times C \times C) \subseteq D$$

and basic right-composition yields four constraints including $$\pi_{46} \sigma_{1=3,2=5}(E \times (\pi_{13} f_{12}(E)) \times (\pi_{13} f_{12}(E))) \subseteq D$$

which causes DESKOLEMIZE to fail at the check for repeated function symbols. Therefore, right compose fails to eliminate C. The elimination of C is impossible by any means.

Right compose may introduce the empty relation symbol Ø into the constraints during composition in the case where S does not appear on the rhs of any constraint. In this step, an attempt to eliminate the symbol is made, to the extent that knowledge of the operators allows. This is usually possible and often results in constraints disappearing entirely. For the basic relational operators, use is made of rewriting rules derived from the following identities for the basic relational operators:

| | | |
|---|---|---|
| $E_1 \cup \emptyset = E_1$ | $E_1 \cap \emptyset = \emptyset$ | $E_1 - \emptyset = E_1$ |
| $\emptyset - E_1 = \emptyset$ | $\sigma_c(\emptyset) = \emptyset$ | $\pi_f(\emptyset) = \emptyset$ |

In addition, the user is allowed to supply rewriting rules for user-defined operators. The constraints are rewritten using these rules until no rule applies. At this point, some constraints may have the form $\emptyset \subseteq E_2$. These constraints are then simply deleted, since the constraints are satisfied by any instance. The empty relation symbol is not always successfully removed from the constraints. However, this is acceptable, since a constraint containing Ø can still be checked.

The disclosed algorithm retains symbols that could not be eliminated in the mappings as second-order constraints as long as possible. Subsequent composition operations can eliminate many of those symbols.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
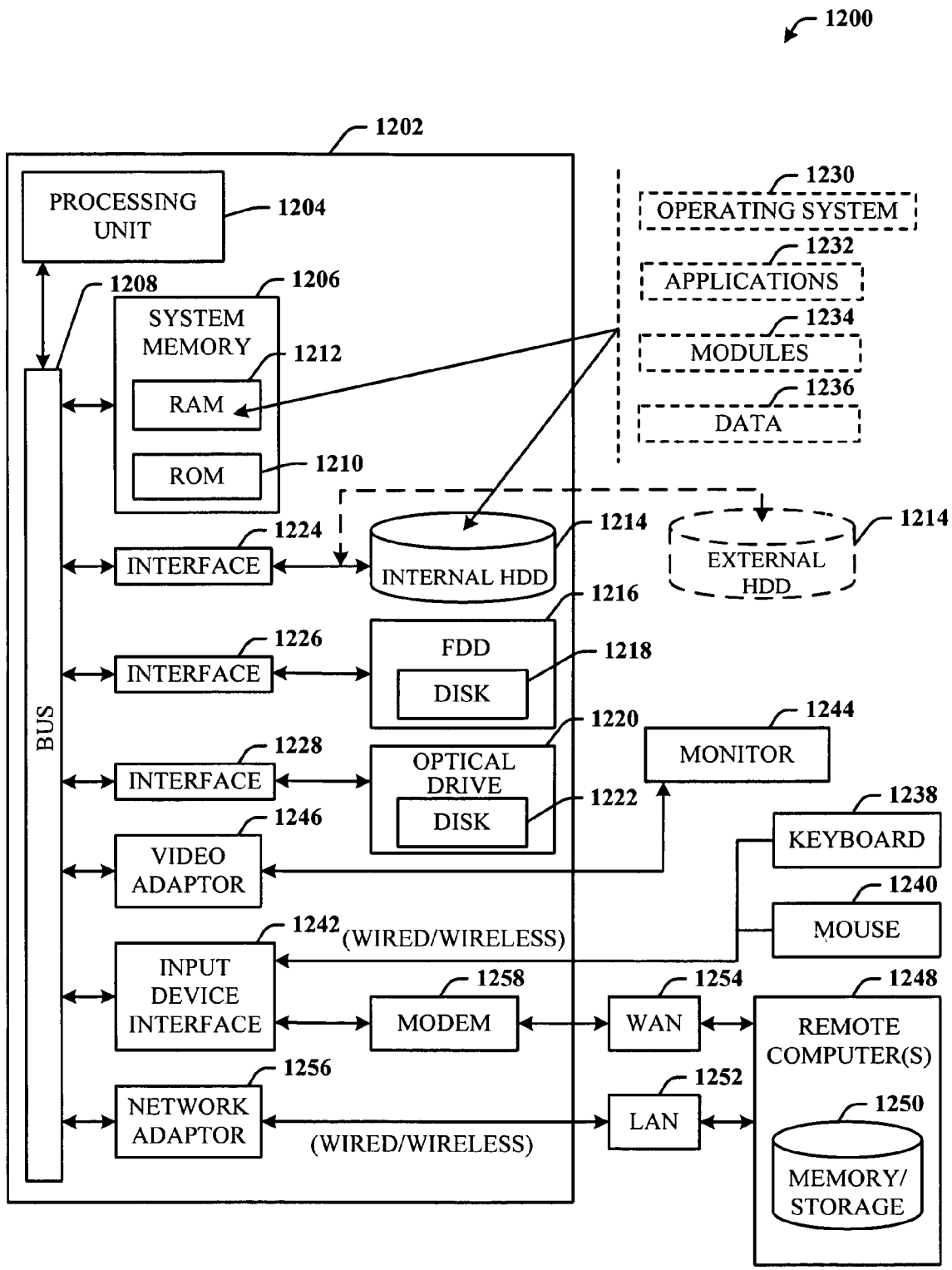
FIG. 12 illustrates a block diagram of a computing system operable to execute the disclosed composition algebraic algorithm.

Referring now to FIG. 12, there is illustrated a block diagram of a computing system 1200 operable to execute the disclosed composition algebraic algorithm. In order to provide additional context for various aspects thereof, FIG. 12 and the following discussion are intended to provide a brief, general description of a suitable computing system 1200 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202, the computer 1202 including a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth, which can utilize mapping and composition in accordance with the disclosed algebraic algorithm. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1212, including an operating system 1230, one or more application programs 1232, other program modules 1234 (e.g., the algebraic composition algorithm) and program data 1236. All or portions of the operating system, applications, modules, and/or data can also be cached in the RAM 1212. It is to be appreciated that the innovation can be implemented with various commercially available operating systems or combinations of operating systems in which data is desired to be mapped and composed algebraically.

A user can enter commands and information into the computer 1202 through one or more wired/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 13:
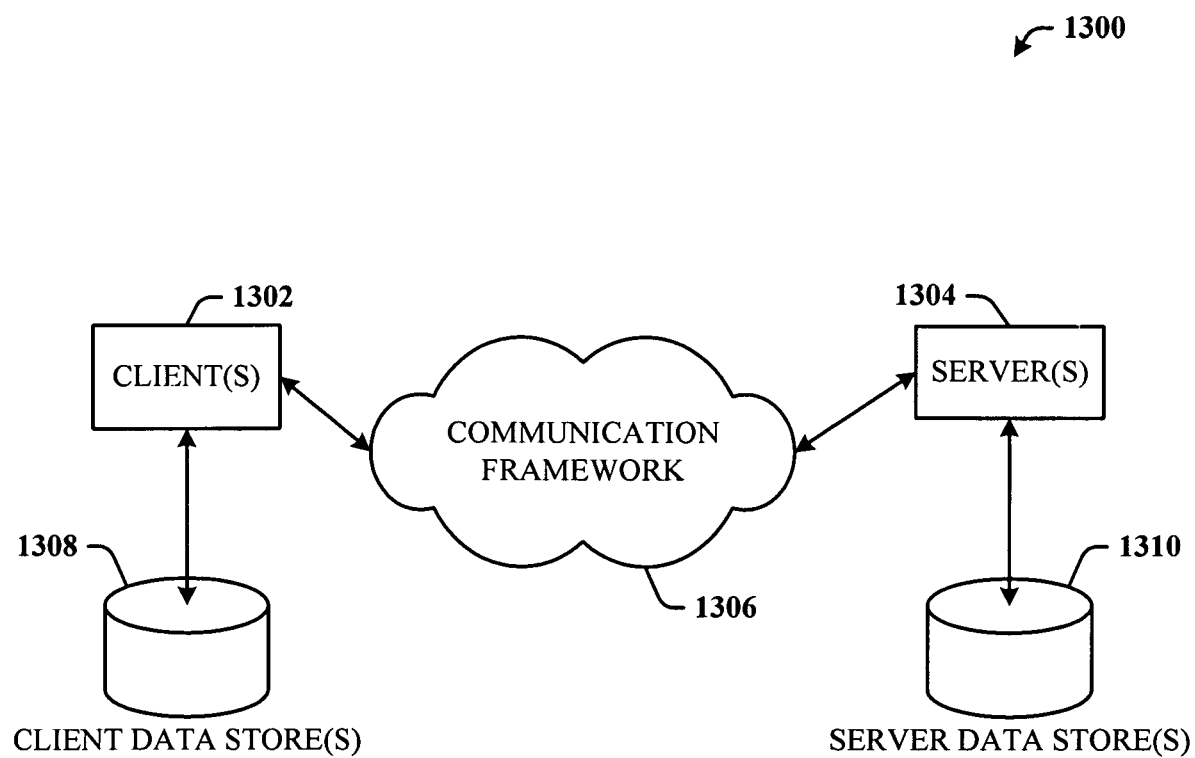
FIG. 13 illustrates a schematic block diagram of an exemplary computing environment that can benefit from algebraic composition mapping of the innovation.

Referring now to FIG. 13, there is illustrated a schematic block diagram of an exemplary computing environment 1300 that can benefit from the composition of algebraic mappings of the innovation. The system 1300 includes one or more client(s) 1302. The client(s) 1302 can be hardware and/or software (e.g., threads, processes, computing devices). The client(s) 1302 can house cookie(s) and/or associated contextual information by employing the subject innovation, for example.

The system 1300 also includes one or more server(s) 1304 (e.g., relational). The server(s) 1304 can also be hardware and/or software (e.g., threads, processes, computing devices). The servers 1304 can house threads to perform transformations (of disparate datasets) by employing the composition architecture, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data management, comprising:
   a processor coupled to a computer-readable storage medium,
   the computer-readable storage medium comprising:
      an input component for receiving mapping data between dataset schemas, the mapping data expresses constraints between the dataset schemas using algebraic operators; and
      a composition component for composing the mapping data into output mapping data using an algebraic language, the output mapping data preserving the constraints between the schemas, wherein the composition component initiates a best-effort process to eliminate as many relation symbols as possible to provide a partial solution for the output mapping data.

2. The system of claim 1, wherein the algebraic operators are relational.

3. The system of claim 1, wherein the composition component composes the mapping data using a relational algebraic language of operators that express embedded dependencies.

4. The system of claim 1, wherein the composition component outputs the output mapping data as a partial solution if unable to find a complete solution.

5. The system of claim 1, wherein the composition component eliminates a relation symbol of the algebraic language from an intermediate schema.

6. The system of claim 1, wherein the mapping data includes an unknown algebraic operator and the composition component delays handling of the unknown operator.

7. The system of claim 1, wherein the composition component analyzes the mapping data for monotonic properties of algebraic operators in associated operator arguments.

8. The system of claim 1, wherein the composition component facilitates rewrite of a constraint in a form where a single symbol appears on one side of a containment operator or an equality operator.

* * * * *